US012614065B2

(12) United States Patent
Vija et al.

(10) Patent No.: US 12,614,065 B2
(45) Date of Patent: Apr. 28, 2026

(54) ENHANCEMENT OF WEAK SIGNAL FOR MACHINE TRAINING NEURAL NETWORK REPRESENTING A SOLID-STATE DETECTOR

(71) Applicants:Siemens Medical Solutions USA, Inc., Malvern, PA (US); Northwestern University, Evanston, IL (US)

(72) Inventors: Alexander Hans Vija, Evanston, IL (US); Miesher Rodrigues, Buffalo Grove, IL (US); Srutarshi Banerjee, Chicago, IL (US); Aggelos Katsaggelos, Chicago, IL (US)

(73) Assignees: Siemens Medical Solutions USA, Inc., Malvern, PA (US); Northwestern University, Evanston, IL (US)

( * ) Notice: Subject to any disclaimer, the term of this patent is extended or adjusted under 35 U.S.C. 154(b) by 1226 days.

(21) Appl. No.: 17/302,718

(22) Filed: May 11, 2021

(65) Prior Publication Data
US 2022/0366232 A1     Nov. 17, 2022

(51) Int. Cl.
G06N 3/08          (2023.01)
G06N 3/04          (2023.01)
(Continued)

(52) U.S. Cl.
CPC ................. G06N 3/08 (2013.01); G06N 3/04 (2013.01); *G06N 3/0442* (2023.01); *G06N 3/0464* (2023.01)

(58) Field of Classification Search
CPC .......... G06N 3/08; G06N 3/04; G06N 3/0442; G06N 3/0464
See application file for complete search history.

(56) References Cited

U.S. PATENT DOCUMENTS

| | | | | |
|---|---|---|---|---|
| 2004/0027127 A1* | 2/2004 | Mills | ................... | G01R 33/482 |
| | | | | 324/317 |
| 2008/0134076 A1* | 6/2008 | Pannese | ................. | G05B 17/02 |
| | | | | 715/772 |

(Continued)

FOREIGN PATENT DOCUMENTS

WO      WO-2019183584 A1 *  9/2019   ............. G06N 3/045

OTHER PUBLICATIONS

A Unified Simulation of Schottky and Ohmic Contacts, Kazuya Matsuzawa, Ken Uchida, and Akira Nishiyama (Year: 2000).*

(Continued)

*Primary Examiner* — Cesar B Paula
*Assistant Examiner* — John M Heffington

(57)          ABSTRACT
A physics-based network model is trained to learn weights such as trapping, detrapping, and/or transport of holes and/or electrons, as well as voltage distribution on a voxel-by-voxel basis throughout a solid-state detector model. The physics-based network may be used to estimate material property variation throughout the voxels. Anode and cathode signals as well as the voltage distribution are relatively strong signals compared to the weaker electron and hole signals. The relatively weaker signals may be limited in range across voxels. In order to expand the range or magnify the effect, the loss function used in training the physics-based neural network may use a weighted combination where the weaker signals are weighted more heavily than stronger signals without substantially reducing the influence of the stronger signals. This improves the inference, resulting in improvement of the accuracy and range of the trained physics-based model.

10 Claims, 16 Drawing Sheets

(51) Int. Cl.
  *G06N 3/0442* (2023.01)
  *G06N 3/0464* (2023.01)

(56) References Cited

U.S. PATENT DOCUMENTS

| | | | |
|---|---|---|---|
| 2014/0151687 A1* | 6/2014 | Yamazaki | H01L 29/78696 |
| | | | 438/151 |
| 2017/0177808 A1* | 6/2017 | Irwin | G16H 40/63 |
| 2021/0145393 A1* | 5/2021 | Gao | G06T 7/0012 |
| 2021/0166375 A1* | 6/2021 | Pandev | G06T 11/006 |

OTHER PUBLICATIONS

Finite Element Method Charge Transport, Andreas Greiner, Lars Pastewka (Year: 2025).*
Theoretical Investigation on Coupled Mass Charge Transport, Cappai et al, (Year: 2025).*
D. P. Kingma and J. Ba, "Adam: A method for stochastic optimization," arXiv preprint arXiv:1412.6980, 2014.
J. Willard, X. Jia, S. Xu, M. Steinbach, and V. Kumar, "Integrating physics-based modeling with machine learning: A survey," arXiv preprint arXiv:2003.04919, Jul. 2020.
M. Rodrigues, "High-flux experiments and simulations of pulse-mode position-sensitive CdZnTe pixelated detectors," Ph.D. dissertation, University of Michigan, 2012.
M. Rodrigues, "High-flux experiments and simulations of pulse-mode 3D-position-sensitive CdZnTe pixelated detectors." 2011 IEEE Nuclear Science Symposium Conference Record. IEEE, 2011.
U.S. Appl. No. 16/850,231, filed Apr. 16, 2020.

* cited by examiner

Cathode Side

Anode Side

| Property | Material "1" | Material "2" |
|---|---|---|
| Mobility of free electrons [cm²/V/s] | 1000 | |
| Mobility of free holes [cm²/V/s] | 50 | |
| Diffusion coefficient of free electrons [cm²/s] | 18.975 | |
| Diffusion coefficient of free holes [cm²/s] | 1.265 | |
| Probability of electrons trapping into defect level "1" [%] | 10 | 0 |
| Probability of electrons detrapping from defect level "1" [%] | 20 | 100 |
| Probability of holes trapping into defect level "1" [%] | 10 | 0 |
| Probability of holes detrapping from defect level "1" [%] | 1 | 100 |
| Probability of holes trapping into defect level "2" [%] | 20 | 0 |
| Probability of holes detrapping from defect level "2" [%] | 1 | 100 |

*Fig. 1B*

70 —— Model Solid State Detector as Physics-based Network

72 —— Select Weights for Weighted Loss Function

74 —— Machine Train Physics-based Network

76 —— Calculate Loss using Weighted Combination of Weak and Strong Signals

78 —— Store Trained Physics-based Network

100        Receive Input Charge

102        Generate Voxel-by-voxel  with Trained Network

104        Display Voxel-by-voxel over time-steps

ENHANCEMENT OF WEAK SIGNAL FOR MACHINE TRAINING NEURAL NETWORK REPRESENTING A SOLID-STATE DETECTOR

BACKGROUND

In the medical field, detectors on imaging devices such as CT, SPECT and X-ray scanners have been proposed with solid-state materials. In order to determine if a material is suitable for a particular application, typically an expert must perform a thorough material characterization using specialized equipment and expertise. The characterization of solid-state detectors in literature, so far has been done by numerous experimental measurements and simulations using dedicated equipment. A major limitation of such conventional methods is that materials can only be characterized as a single or a couple of properties in the bulk. It is challenging, if not impossible, to have a detailed description of the material properties on a voxel-by-voxel basis for voxel sizes in micrometer scale. Moreover, the resource and time required to achieve more detailed results using conventional measurements are not justifiable.

Rather than describing the physics in detail, the physical phenomena (charge and voltage distribution based on physics) of the solid-state material may be modeled based on machine learning in order to more quickly characterize or describe the solid-state detector. U.S. Pat. No. 11,480,608 (Ser. No. 16/850,231, filed Apr. 16, 2020) teaches a network model for predicting trapping, detrapping, and/or transport of holes and/or electrons as well as voltage distribution on a voxel-by-voxel basis throughout the solid-state detector model. While rapidly providing the physical phenomena, this network model may have spatial limitations in the prediction for weaker signals as compared to stronger signals.

SUMMARY

Embodiments of the present invention address and overcome one or more of the above shortcomings and drawbacks. Rather than describing the physics in detail, the physical phenomena (charge and voltage distribution based on physics) of the solid-state material may be modeled based on machine learning in order to more quickly characterize or describe the solid-state detector. Methods, systems, and apparatuses related to a space time network for solid-state material studies. U.S. Pat. No. 11,480,608 (Ser. No. 16/850, 231, filed Apr. 16, 2020) teaches a network model for predicting trapping, detrapping, and/or transport of holes and/or electrons as well as voltage distribution on a voxel-by-voxel basis throughout the solid-state detector model. The network may be used to estimate material property or charge and voltage variation throughout. Anode and cathode signals as well as the voltage distribution are relatively strong signals compared to the weaker electron and hole signals. Electron signals may be stronger than hole signals. As a result, the relatively weaker signals may be limited in range across voxels from a given injection location. Since holes travel less rapidly than electrons, the spatial limitation is even greater for holes. In order to expand the range or magnify the effect, the loss function used in training the model may use a weighted combination where the weaker signals are weighted more heavily than stronger signals without substantially reducing the influence of the stronger signals. This improves the inference, resulting in improvement of accuracy and range of the trained model.

In a first aspect, a method is provided for training a network modeling physical phenomena of semiconductor material. The network is machine trained. The network models the semiconductor material in voxels, where each voxel is represented in the network by a tensor field defined by (i) a location of the voxel within the semiconductor material and (ii) one or more physics-based phenomena including transport of holes or electrons within the voxel at the location. A loss is calculated as part of the training. The loss is a weighted combination of anode or cathode signals or voxel voltages and the transport of holes or the electrons. A first weight in the weighted combination for transport of the holes or electrons is at least an order of magnitude greater than a second weight in the weighted combination for the anode or cathode signals or voxel voltages.

In one embodiment, one or more physics-based phenomena includes transport of electrons and holes within the voxels. Calculating the loss includes transport of the electrons and holes in weighted combination. The first weight in the weighted combination is for the transport of the holes. A third weight in the weighted combination for the transport of electrons is at least an order of magnitude greater than the second weight in the weighted combination for the anode or cathode signals or voxel voltage. In a further embodiment, the one or more physics-based phenomena includes both the anode or cathode signals and the voxel voltage, trapping of holes, the transport of holes, trapping of the electrons, and the transport of electrons. The loss calculation includes the anode or cathode signals and voxel voltage, the trapping of holes, the transport of holes, the trapping of electrons, and the transport of electrons in the weighted combination. The first weight is applied to a first sum for the transport and trapping of holes, the second weight is applied to a second sum for the anode or cathode signals and the voxel voltage, and the third weight is applied to a third sum for the transport and trapping of the electrons. In another example embodiment, the first weight is 0.05-0.15, the second weight is 50-150, and the third weight is 50-150.

In other embodiments, the one or more physics-based phenomena includes trapping of holes or electrons within the voxel at the location. The loss includes the transport of the electrons or the holes and the trapping of the electrons or the holes in the weighted combination. The weight in the weighted combination is for a sum of the transport and the trapping of the holes or electrons. In yet other embodiments, the one or more physics-based phenomena includes trapping of holes or electrons within the voxel at the location. The loss includes the transport of the electrons or the holes and the trapping of the electrons or the holes in the weighted combination. The first weight in the weighted combination is for the transport of the holes or electrons and a third weight in the weighted combination is for the trapping of the holes or electrons such that different weights are applied for trapping than for transport The weights (e.g., first and second weights) may be selected through optimization. For example, the machine training is used to select the weights based on a minimum loss across the voxels. The weights leading to a minimum loss or loss below a threshold are used for training the final network.

In an embodiment, the physics-based phenomena include the transport of the holes. The loss with the weighted combination for a given instance of injected charge to the semiconductor material has a greater spatial range for the transport of the holes than where the first weight has a smaller value.

The training data for the machine training is from one or more different sources. For example, the training data is from a combination of measurements for a physical room temperature semiconductor detector and sample augmentation (e.g., synthetically created data such as from simulation). The loss is calculated as a difference between ground truth in training pairs and an estimated output generated using the tensor input.

In a second aspect, a method is provided for enhancement of weak signals in machine training a charge transport network representing a solid-state detector. The solid-state detector is modeled as a network including signals at voxels. The signals at each voxel include a relatively weak signal and a relatively strong signal. The neural network is machine trained using a first loss with respect to the relatively weak signal and a second loss with respect to the relatively strong signal. The first and second losses are combined for the machine training where the first loss is weighted more greatly than the second loss. The neural network as trained is stored.

In one embodiment, the relatively weak signal is for holes, and the relatively strong signal is for voltage. In other embodiments, the relatively weak signal is for electrons, and the relatively strong signal is for voltage.

Various relative weighting may be used. For example, the first loss is weighted higher by at least two orders of magnitude than the second loss. In one embodiment, the first and second weights are set based on a minimum loss in performance of the network.

Other weights may be used. For example, the relatively weak signal is modeled for transport of holes, and the relatively strong signal is modeled for voxel voltage. The signals at each voxel in the modeling further include signals for the trapping of the holes, the transport of the electrons, and the trapping of the electrons. The first loss is used for the transport and trapping of holes, the second loss is used for the voxel voltage and anode and cathode signals, and a third loss is used for the transport and trapping of electrons.

In a third aspect, a method is provided for application of a trained network modeling physical phenomena of a semiconductor material. An input charge measurement is received. A voxel-by-voxel description of a semiconductor's material properties is generated by applying the input charge measurement to the trained network. The trained network models holes, electrons and voltage voxel-by-voxel as the physical phenomena of the semiconductor material. The trained neural network was trained with a weighted loss function using a first weight for the holes, a second weights for the electrons, and a third weight for the voltage. The first and second weights were at least double the third weight. At least a portion of the voxel-by-voxel description of the semiconductor's material properties are displayed in a graphical user interface. The voxel-by-voxel description for the holes may be over a greater range of voxels due to the first weight having been at least double the third weight.

In one embodiment, the network was trained with the first and second weights at least two orders of magnitude greater than the third weight. Other weights may be used. For example, the voxel-by-voxel description is generated as hole trapping, hole transport, electron trapping, electron transport, and voltage magnitude. The network was trained with the first weight for the hole transport, the second weight for the electron transport, the third weight for the voltage magnitude, a fourth weight for the hole trapping, and a fifth weight for the electron trapping.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, they are shown in the drawings embodiments that are presently preferred, it being understood, however, that the invention is not limited to the specific instrumentalities disclosed. Included in the drawings are the following Figures:

FIG. 1B shows a table with properties for two slightly different materials with the electrode configuration shown in FIG. 1A;

DETAILED DESCRIPTION

Figure 1A:
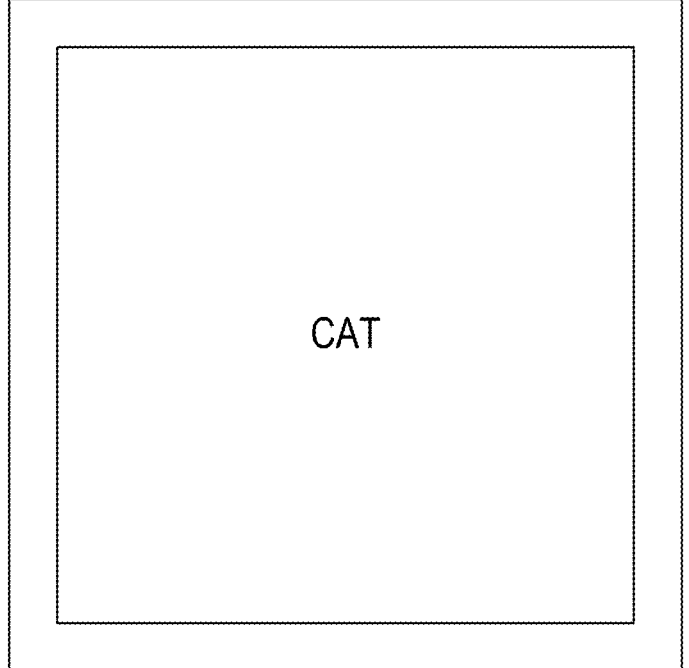
FIG. 1A shows an electrode pattern on a semiconductor detector, according to some embodiments.

For a deep learning network, the measurements of weak or faint physical quantities are enhanced by stronger weighting in the loss calculation, magnifying or enhancing the impact of the weak quantities in training. The description below is separated into two parts. The first part (PART 1) addresses some example embodiments of neural network training and resulting trained networks. U.S. Pat. No. 11,480,608 (Ser. No. 16/850,231, filed Apr. 16, 2020) describes the first part and is incorporated herein by reference. The second part (PART 2) addresses the use of a weighted combination in the loss used for training the neural network. The network is physics-based in that the network models physical phenomena, such as charge and voltage by voxel.

In one embodiment of the first part, room temperature semiconductor detectors (RTSD) (e.g., CdTe, CdZnTe and TlBr) are modeled as a voxel-by-voxel material characterization, as low as a few microns in voxel sizes. Transport properties and material defects for electrons and/or holes are characterized using a physics-inspired learning model based on transport of charges to find the properties of these materials, such as drift, trapping, detrapping, and/or recombination coefficients for charge carriers electrons and/or holes, hence capturing fluctuations at the voxel scale. The actual physical detector is sub-divided in a 3-D array of voxels in space covering the entire detector volume. Any number of voxels may be used, such as 100, 200, 400, or higher. The model considers different material properties and transforms the properties into connected learnable voxel-by-voxel parameters with appropriate boundary conditions determined by known operating conditions (i.e., voltage applied at the boundaries). Like other traditional learning models, this model is trained by a set of input and output data pairs. The input data are electron-hole pairs injected at voxel locations of the model while the output data are corresponding signals at the electrodes along with charges within the model. Signals in the learning model are calculated dynamically using the Schockley-Ramo theorem. Since signals at electrodes and charges in the voxels change over multiple epochs and time for a single electron-hole injection, this is also considered in the output data. The input-output training data is generated independently using simulation of the transport of charges and solves for the output signals similar to observed actual measurements. A loss function is formulated by considering the mean squared error in the output data generated from this model and ground truth data fed during training the model. Using ADAM or other optimizer, the model is trained for 4000 epochs with a training error of approximately 0.01.

The deep learning-based physical model is used to determine the material properties of RTSD features. The material properties are determined at a fine resolution, such as at microscopic level. The model is physics-based, so has 1-1 relationship between unknown parameters and actual physical parameters (e.g., trapping and detrapping lifetimes, drift coefficients, etc.). The model includes any desired phenomena, such as charge transport, trapping, detrapping, and/or recombination.

In the second part, training of the model uses different weights for different signals in the loss function. In training, different realizations of loss functions can be tested. Many different numbers of combinations exist. Changing the weights of loss function coefficients may improve or degrade the inference method in the deep learning of the physics-based model. Since some of the quantities (e.g., holes and/or electrons charges) being inferred by the model are relatively weak (e.g., faint signature, almost imperceptible by naked eye) as compared to stronger quantities (e.g., voltage or anode or cathode signals), the weights in the loss function may be selected to improve the inference. For example, equal weighting of both strong and weak signals may cause the coefficients for weak quantities (e.g., holes) to be abnormally incorrect in training. By increasing the weight or weights for the weak quantities relative to the strong quantities, the inference of the material properties of the RTSD may be improved.

Part 1:

The model is developed from actual physical equations. For example, the detector is characterized with respect to the drift, trapping and other coefficients for both electrons and holes. A one-to-one mapping between the model weights and the detector material properties are provided in a voxelized region. In RTSD, the charge transport properties (both electrons and holes) play a major role in determining the response at the electrodes. The major physical phenomena of the charge carriers are: (i) drift of charges, (ii) free mobile charges getting trapped and de-trapped in defect levels within the material, (iii) recombination of free excess electrons with the intrinsic holes in the material, and, vice-versa for free holes.

Systems, methods, and apparatuses are described herein which relate generally to a space time electron-hole charge transport network for solid-state material studies. Briefly, the problem of measuring semiconductor material properties is modeled as a physics-based network with weights that are directly related with the physical properties of the material. The characteristics of the material are obtained by solving for the weights in an inverse manner. The techniques disclosed herein uses the output signals and input charges to optimally learn the weights of the model. This forms a training pair. The more training pairs utilized, the closer are the learned weights to the actual values. According to some embodiments, a gradient descent-based approach is taken to optimize the weights of the model based on the loss function computation in each step.

In solid-state devices, the properties of the flow of electric current through the material, commonly referred to as charge transport, plays a significant role in determining if one material is better suited for an application compared to another. For example, CdZnTe detectors are known to be plagued by shallow defect levels. Conventional compensation techniques used to increase the resistivity of CdZnTe detectors introduce deep defect levels in the material. In turn, the deeper defects act as trapping centers, trapping free carriers for longer times, degrading the performance of the detectors.

Semiconductor radiation detectors and other solid-state materials are typically characterized by finding the material properties that are relevant to quantify the transport of charges inside the material, i.e., electrons and holes charge mobility $\mu_e$ and $\mu_h$; electrons and holes trapping times for M electrons and N holes trapping centers, $T_{e1}, T_{e2}, T_{e3}, \ldots, T_{eM}$ and $T_{h1}, T_{h2}, T_{h3}, \ldots, T_{hN}$; and electrons and holes de-trapping for M electrons and N holes de-trapping centers, $T_{de1}, T_{de2}, T_{de3}, \ldots, T_{deM}$ and $T_{dh1}, T_{dh2}, T_{dh3}, \ldots, T_{dhN}$. De-trapping times can be converted into defect energy levels, such that shallow traps correspond to shorter de-trapping times while deeper traps correspond to longer de-trapping times. Trapping times are related to the density of traps in the material for both electrons and holes. At a microscopic level, the overall effect is observed as a hopping mechanism of charge transport for both electrons and holes. These charges are driven by the electric field until collected by corresponding electrodes, and signals are induced in these electrodes due to the movement of these charges. The coupled system of equations that represent charge transport can be written as:

$$\frac{\partial n_e}{\partial t} + \nabla \cdot (n_e \mu_e \cdot \nabla \emptyset) - \nabla \cdot (D_e \cdot \nabla n_e) =$$

$$-\frac{n_e}{\tau_{et1}} + \frac{\tilde{n}_{e1}}{\tau_{ed1}} - \frac{n_e}{\tau_{et2}} + \frac{\tilde{n}_{e2}}{\tau_{ed2}} - \ldots \ldots - \frac{n_e}{\tau_{etN}} + \frac{\tilde{n}_{eN}}{\tau_{edN}} + \delta_e$$

$$\frac{\partial n_h}{\partial t} + \nabla \cdot (n_h \mu_h \cdot \nabla \emptyset) - \nabla \cdot (D_h \cdot \nabla n_h) =$$

$$-\frac{n_h}{\tau_{ht1}} + \frac{\tilde{n}_{h1}}{\tau_{hd1}} - \frac{n_h}{\tau_{ht2}} + \frac{\tilde{n}_{h2}}{\tau_{hd2}} - \ldots \ldots - \frac{n_h}{\tau_{htP}} + \frac{\tilde{n}_{hP}}{\tau_{hdP}} + \delta_h$$

$$\frac{\partial \tilde{n}_{e1}}{\partial t} = \frac{n_e}{\tau_{et1}} - \frac{\tilde{n}_{e1}}{\tau_{ed1}}$$

$$\frac{\partial \tilde{n}_{e2}}{\partial t} = \frac{n_e}{\tau_{et2}} - \frac{\tilde{n}_{e2}}{\tau_{ed2}}$$

$$\vdots$$

$$\frac{\partial \tilde{n}_{eN}}{\partial t} = \frac{n_e}{\tau_{etN}} - \frac{\tilde{n}_{eN}}{\tau_{edN}}$$

$$\frac{\partial \tilde{n}_{h1}}{\partial t} = \frac{n_h}{\tau_{ht1}} - \frac{\tilde{n}_{h1}}{\tau_{hd1}}$$

$$\frac{\partial \tilde{n}_{h2} -}{\partial t} = \frac{n_h}{\tau_{ht2}} - \frac{\tilde{n}_{h2}}{\tau_{hd2}}$$

$$\vdots$$

$$\frac{\partial \tilde{n}_{hP} -}{\partial t} = \frac{n_h}{\tau_{htP}} - \frac{\tilde{n}_{hP}}{\tau_{hdP}}$$

$$D_e = \mu_e \frac{kT}{e}$$

$$D_h = \mu_h \frac{kT}{e}$$

where, $n_e$: free electron concentration in excess of equilibrium $n_h$: free hole concentration in excess of equilibrium $\tilde{n}_{eN}$: trapped electron concentration in defect level N= 1, 2, . . .

$\tilde{n}_{hP}$: trapped hole concentration in defect level P= 1, 2, . . .

$\tau_{etN}$: electron trapping lifetime in defect level N= 1, 2, . . .

$\tau_{htP}$: hole trapping lifetime in defect level P=1, 2, . . .

$\mu_e$: mobility of free electrons $\mu_h$: mobility of free holes $D_e$: diffusion coefficient of free electrons $D_h$: diffusion coefficient of free holes $\delta_e$: electron source term $\delta_h$: hole source term $\emptyset$: electrical potential e: charge of an electron and other terms, $$\nabla^2 \emptyset = -k \frac{e}{\varepsilon_0} (n_e + \tilde{n}_{e1} + \tilde{n}_{e1} + \tilde{n}_{e2} + \ldots + \tilde{n}_{e2} + n_h + \tilde{n}_{h1} + \tilde{n}_{h2} + \ldots + \tilde{n}_{hp})$$

where, $$E = -\nabla \emptyset$$

At a microscopic level, the system described by the above equations is analytically solved with the source $\delta_e$ and $\delta_h$ given by the electron-hole pairs generated by photon interactions in the material or by other types of interactions, where the number of electrons and holes initially created is proportional to the material band-gap. The various trapping and de-trapping levels of electrons and holes are considered.

A history of previous time steps is recorded as a function of time. Also, the effect of recombination between electrons and holes amongst different trap levels and charges in conduction and valence bands is calculated. In addition, electron and hole charge diffusion is also solved in the model.

Figure 1C:
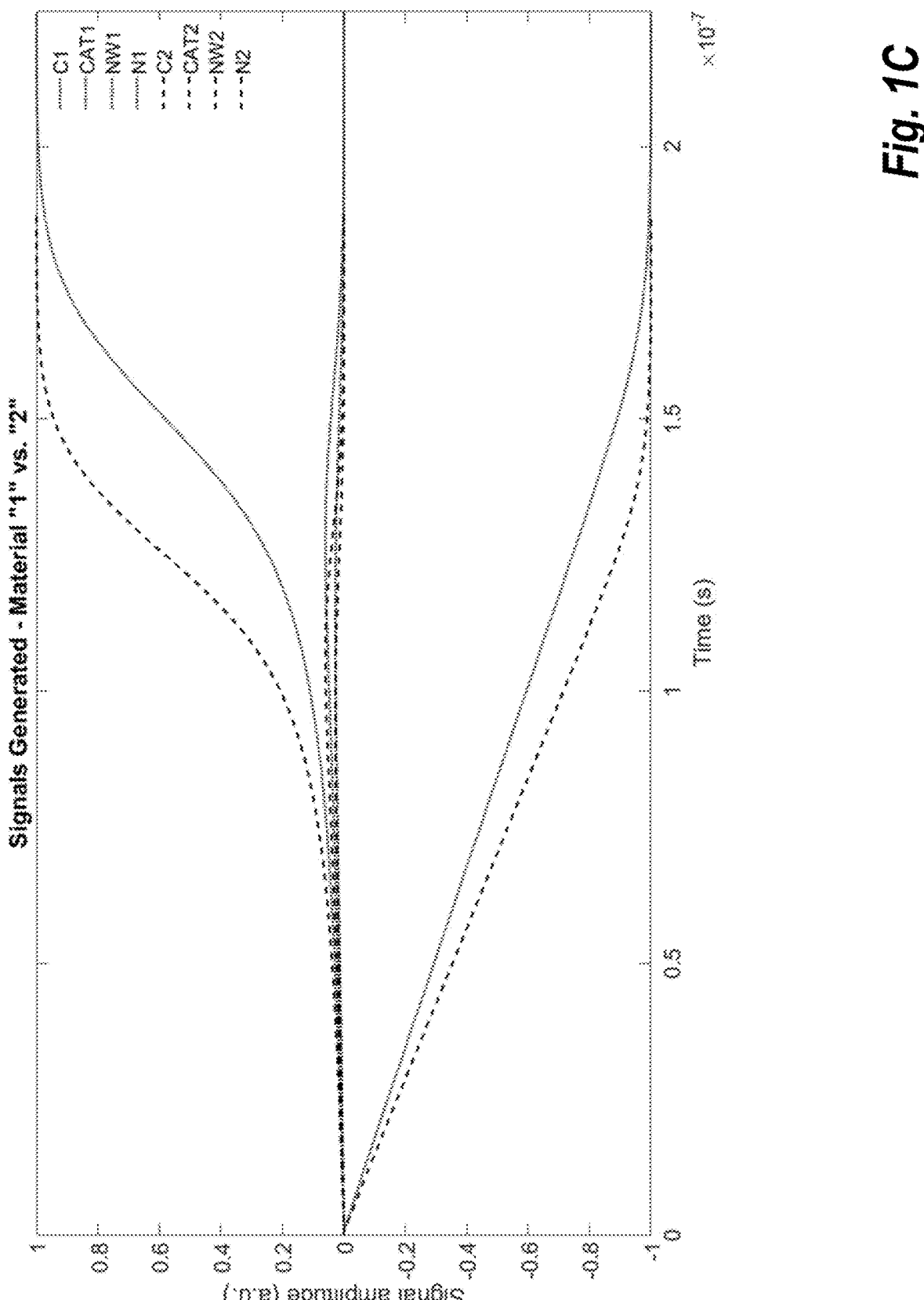
FIG. 1C shows the signals corresponding an electrode pattern on a semiconductor detector, according to some embodiments.

Signals measured in solid-state detectors arise from the drift of charges moving in bulk of the material, i.e., electrons and holes. These signals can be measured using a charge-sensitive amplifier with the addition of other analog and digital electronics. For example, FIG. 1A shows an electrode pattern on a semiconductor detector (CdZnTe) showing 09 (nine) electrodes (NW,N,NE,W,C,E,SW,S and SE) on the anode side, and a single large electrode on the cathode side (CAT). FIG. 1B shows a table with properties for two slightly different materials with the electrode configuration shown in FIG. 1A. FIG. 1C shows the signals simulated corresponding an electrode pattern on a semiconductor detector (CdZnTe) showing 09 (nine) electrodes (NW,N,NE, W,C,E,SW,S and SE) on the anode side, and a single large electrode on the cathode side (CAT).

In contrast to conventional, analytical solutions for solving the nonlinear transport equations set out above, the techniques described herein formulate the transport problem in a neural network framework that incorporates the underlying laws of physics. This framework applies deep learning methods to use multiple layers of the network to progressively extract phenomenon related to semiconductor evaluation from the raw input. The physics-based network described herein may be implemented, for example, by Tensorflow™ (by Google) or PyTorch (by Facebook) on a CPU/GPU computing platform for forward modeling. One example CPU/GPU computing platform is described below with reference to FIG. 6.

The physics-based network discussed herein address four phenomena related to semiconductor evaluations: transport of electrons and holes; trapping and de-trapping of electrons and holes; recombination of electrons and holes; and diffusion of electrons and holes. Each of the phenomena is modeled in the network as one or more weights. The basic unit of computation in this neural network is the voxel (equivalently referred here as a node) that receives inputs from other voxels (nodes) in the network. Each voxel has been modeled with physics-based equations. Weights (learnable parameters) are learned during the training process. The physics-based network described herein is trained using a pair of output signals (from the electrodes) as well as input charge to a discrete element of the material. The physics-based network determines the weights that are identical to the exact parameters estimated from simulation and theoretical calculations. In some embodiments, the loss function for training the physics-based neural network is calculated using the L2 norm of the difference between the output training signals and the signals generated by the network during training. In other embodiments, other formulations of the loss function may be used.

The semiconductor material is assumed to be composed of N voxels. This represents a discretization of the sensor in space. Spatially, the semiconductor material has a cathode on one end and anode on the other end. Charges move from the electrode of one polarity to another—i.e., the electrons move from cathode to anode and holes move from anode to cathode. While the charges transport, the phenomenon of transport, diffusion, trapping, de-trapping and recombination occurs. Assuming causality holds, voxels may be modeled as nodes in space and time, which leads to the formation of "static" space-time fabric. Ideally, the dimensions of the voxel should be as small as possible. However, voxel size is inversely proportional to the computational time required to execute the physics-based network. Thus, the dimensions of each voxel can be selected to allow the physics-based network to execute within a desired run time.

Figure 2:
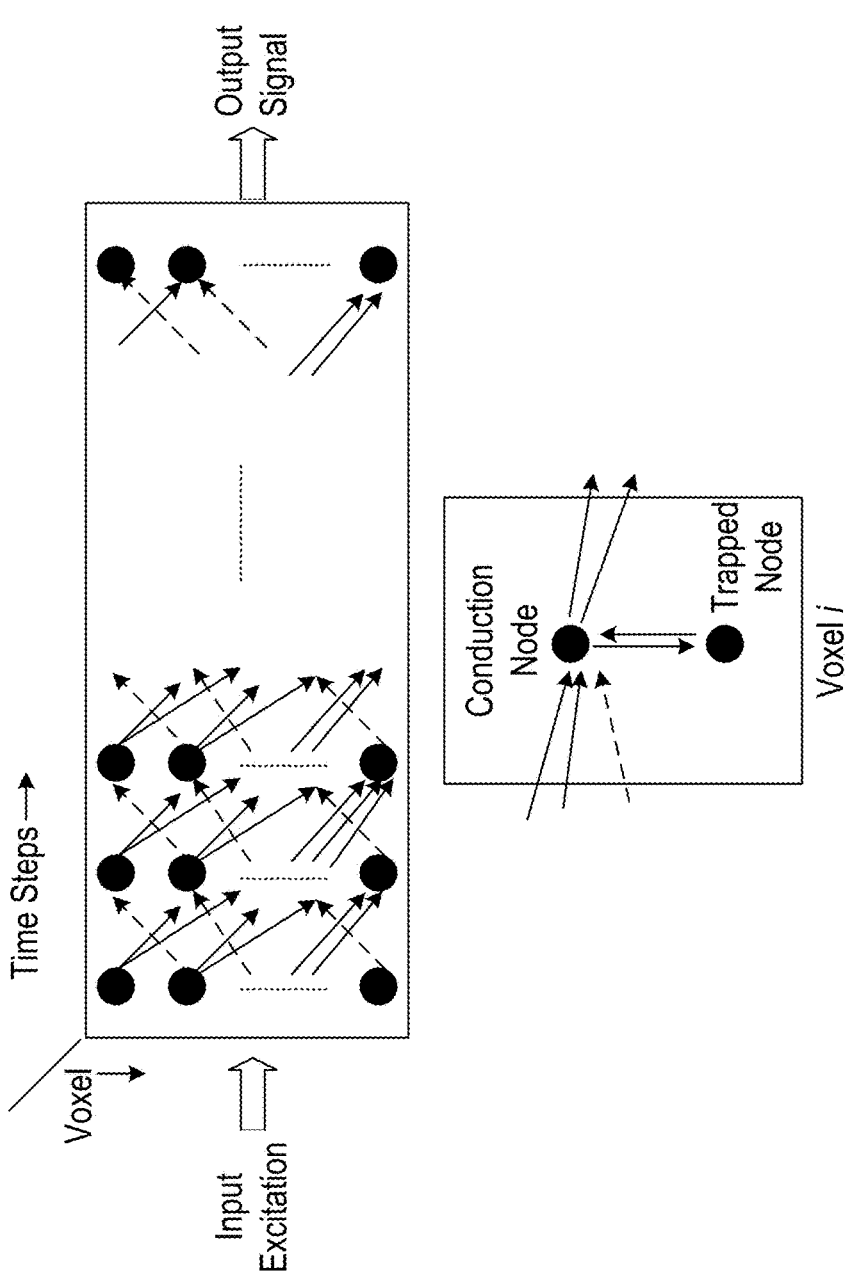
FIG. 2 shows a conceptual view of the space-time model of a semiconductor material that forms the basis of the network, according to some embodiments.

FIG. 2 shows a conceptual view of the space-time model of a semiconductor material that forms the basis of the physics-based network, according to some embodiments. The top image in FIG. 2 shows how charges propagate between voxels over time. Note that the arrows are going up and down because there are electrons and holes that move in opposite directions. As shown in the bottom image in FIG. 2, each voxel comprises a conduction node and a trapped node, just as in the physical model. The conduction node facilitates movement of the charge between voxels, while the trapped node traps charge in the voxel (as depicted by the arrows between the conduction and trapped nodes). Each voxel has a different response that is dependent on the number of trapping centers present in the material. Thus, although this simplified example shows a single conduction node and a single trapped node, it should be understood that a voxel may have multiple trapped nodes based on the properties of the material.

Figure 3:
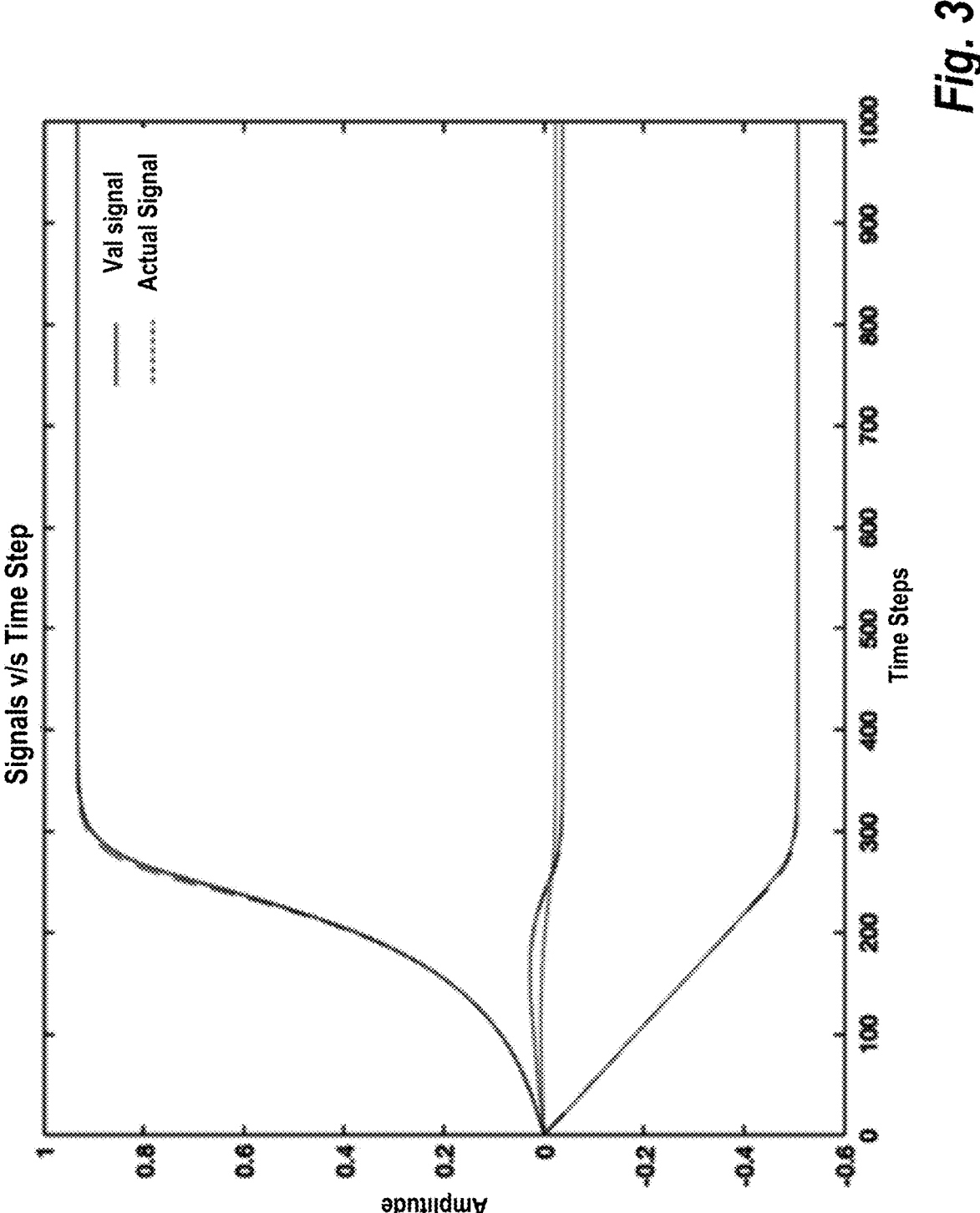
FIG. 3 shows simulated and actual signals for a voxel, according to some embodiments.
Figure 4:
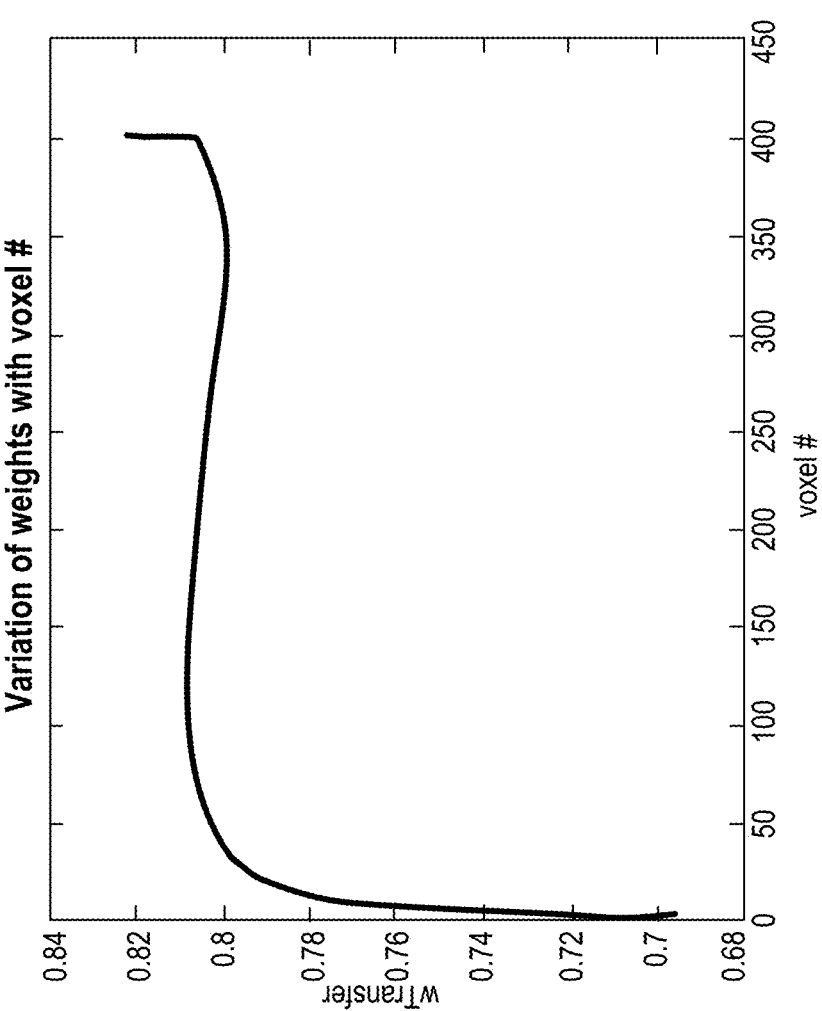
FIG. 4 is a plot that shows the transfer weights as a function of voxel, according to some embodiments.

FIG. 3 shows simulated (val) and actual signals for a voxel using the physics-based neural network described herein according to some embodiments. This figure depicts the different signals in different electrodes. The solid line is the signal that is received as an output of the physics-based neural network using a sample training set, and the dotted line (val) is the ground truth. The accuracy of the machine learning physics-based method is indicated by the amount of overlap of the inferred signal and the ground truth. FIG. 4 is a plot that shows the transport weights as a function of voxel. In this embodiment, the sensor or detector is divided into 400 voxels. The transport weight is correlated with the electric field within the material. The distribution of electric field is a function of position.

The physics-based neural network may be constructed in two phases. First, the network is developed in one-dimensional space and then, the network is expanded in higher dimensional space. As noted above, each of the phenomena (i.e., transport, diffusion, trapping, de-trapping and recombination) is described as a tensor field.

Figure 5A:
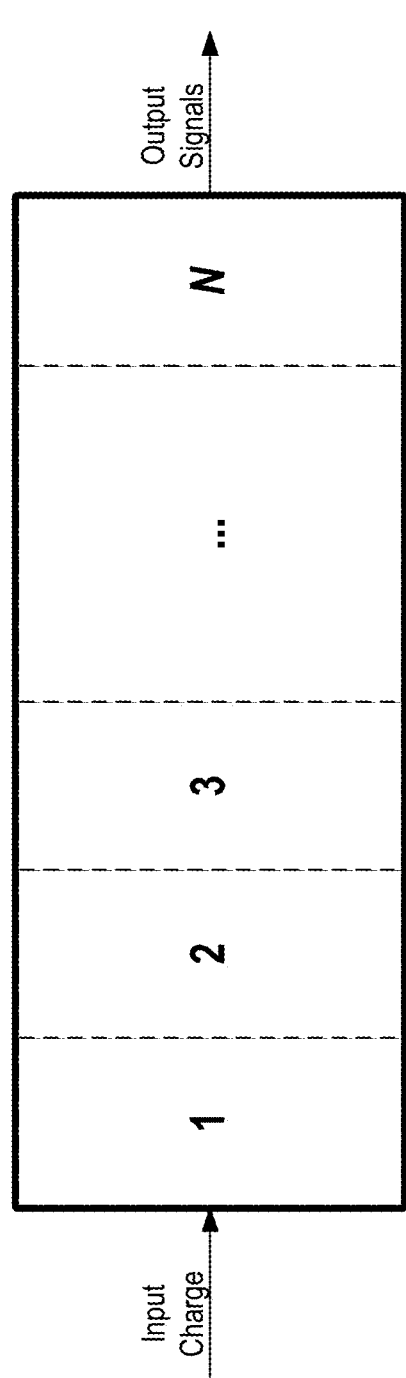
FIG. 5A show the voxel orientation in one dimension, according to some embodiments.
Figures 5B, 5C:
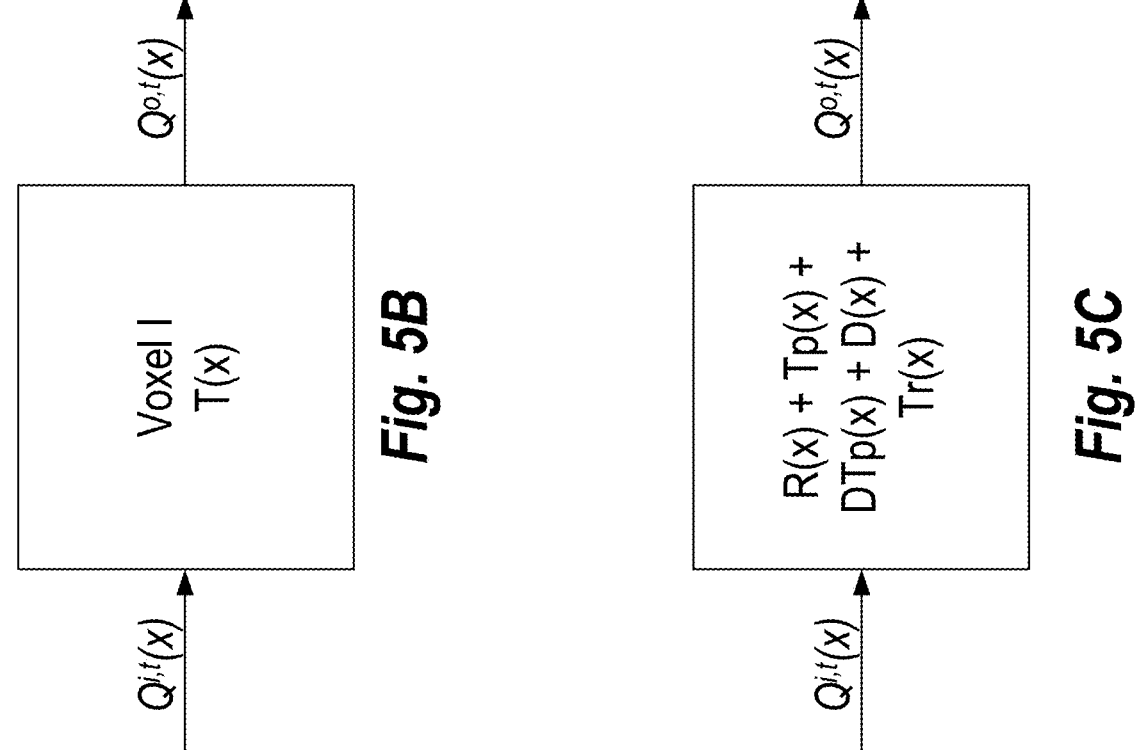
FIG. 5B shows the tensor in one voxel, according to some embodiments.
FIG. 5C shows an alternate view of the tensor in one voxel, according to some embodiments.

The incoming and outgoing charges, which are compactly written herein as $Q^{i,t}(x)$ and $Q^{o,t}(x)$, are coupled with a tensor field T(x) at each voxel location at a given position x inside the material. The charges comprise electrons and holes which are propagating in opposite directions. The tensor field T(x) is composed of several tensors, referred to herein as sub-tensors. The transport of charges is mathematically represented by a tensor field Tr(x) at a location given by position x. The trapping of charges is represented by tensor field Tp(x), de-trapping of charges by tensor field DTp (x), diffusion of charges by tensor field D(x), and recombination of electrons and holes by R(x). The tensor field T(x) at a given location is represented as a subnet and is the basic building block of the network. The sub-tensors are combined using mathematical operations in order of the phenomena occurring within each voxel—recombination, trapping, de-trapping, diffusion and transport. The forward direction of electron propagation is positive x direction. So, the forward direction of hole propagation is in negative x direction. The tensor fields for electrons and holes differ spatially. FIGS. 5A, 5B and 5C show the tensors with voxel orientation in one dimension. The same representation is also valid in 3-dimensional case.

The number of unknown weights in the physics-based neural network is exactly equal to the number of unknown parameters in the material (i.e., the number of parameters in the design space). This is the minimum possible parameters of unknown weights. This is in stark contrast with the conventional, non-physics based neural networks where the number of weights is typically much greater (many orders of magnitude) than the number of parameters in the design space. The training time for the conventional, non-physics based neural networks are orders of magnitude higher than the physics-based neural network described herein.

The sub-tensors comprise weights both inside a voxel i, as well as between a particular voxel i with surrounding voxels. This might be thought of analogous to a Long Short-Term Memory (LSTM)/Gated Recurrent Units (GRU) configuration for a particular voxel. However, instead of having an LSTM cell, the weights within each voxel are driven by physics-based phenomena—i.e., trapping and de-trapping from the shallow and deep electron levels along with recombination of electrons and holes.

Figure 5D:
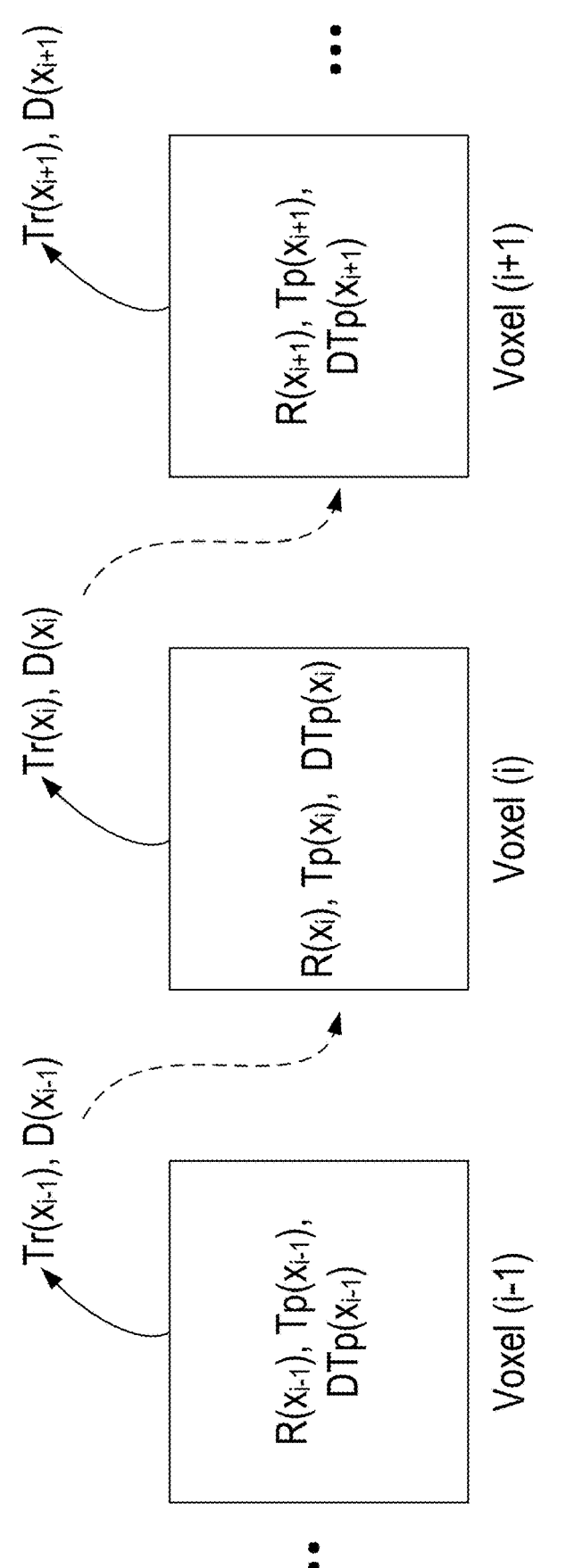
FIG. 5D shows sub-tensors and voxels illustrating this concept.

FIG. 5D shows sub-tensors and voxels illustrating this concept. Inside each of the voxel i, $R(x_i)$, $Tp(x_i)$ and $DTp(x_{i+1})$ occurs while $Tr(x_i)$, $D(x_i)$ represent the diffusion and transport of electrons and holes from one voxel i to neighboring voxels. Since the transport and diffusion of electrons and holes are in opposite directions, each voxel stores the amount of charge due to the electron and due to holes. For example, the transport $Tre(x_i)$ of the electrons is considered to be 5 voxels to the forward x direction, while the transport $Trh(x_i)$ of the holes is considered 2 voxels to the negative x direction. The transport sub-tensor $Tr(x_i)$ is thus a concatenation of $Tre(x_i)$ and $Trh(x_i)$. The diffusion parameters are similarly concatenated. For example, electrons diffuse by 2 voxels in the forward x direction $De(x_i)$ while the holes diffuse by 1 voxel to the negative x direction.

It should be noted that the physics-based neural network described herein does not require several experimental set-ups or numerous simulations in order to estimate the material properties, as in conventional techniques. Thus, the physics-based network provides an easy way of estimating the microscopic properties of the detector but with the numerical accuracy close to simulations. The physics-based network optimizes itself based on the gradient descent steps depending only on output signals and input charge in the voxels. The boundary conditions drive it to the optimal value of weights which are the material properties. The optimization may be performed based only on the signals without using complicated measurements.

This technique of characterizing the material will increase the ability to identify the material properties and defects in the solid-state materials, including semiconductor detectors. This will, in turn, allow the optimization of materials for an application. This will also reduce wastage of solid-state materials in some applications, where better characterization of defect levels enables the use of materials with lower quality having more defects in them. Finally, these benefits combine to provide a cost saving in materials testing in comparison to conventional techniques.

Part 2:

The accuracy of the physics-based model or network described in Part 1 or another such model may be improved. For example, the accuracy related to hole properties is improved by finding the correct values (ground-truth) for hole quantities that were initially difficult to be found due to "weak" signals and responses given by the transport of holes. Signals generated by the moving of holes in RTSD are inherently difficult to measure due to a much lower mobility of holes and shorter lifetime. But, in order to achieve better spectroscopic performance, hole contribution needs to be included. This is particularly important to RTSD where holes may move relatively faster or live relatively longer (e.g., TIBr-based RTSD). The use of weighted loss with increased weighting for weak signals magnifies or enhances the inference in the model, improving and extending the range inside the material for inferring quantities accurately without degrading the accuracy of the other (e.g., electron) inferred quantities.

The deliberate change to the weights of different physical quantities in the loss function used in the deep learning model enhances the physical quantities that inherently have a "weak" and "faint" presence. This allows for better than state-of-the-art performance when correcting for material imperfections in an actual RTSD. The accuracy for the "weak" and "faint" quantities (e.g., holes and/or electrons transport properties in RTSD) is improved by using the weighted loss function with the weak quantities weighted more greatly than the strong quantities. This occurs where the neural network is physics-based.

Figure 7:
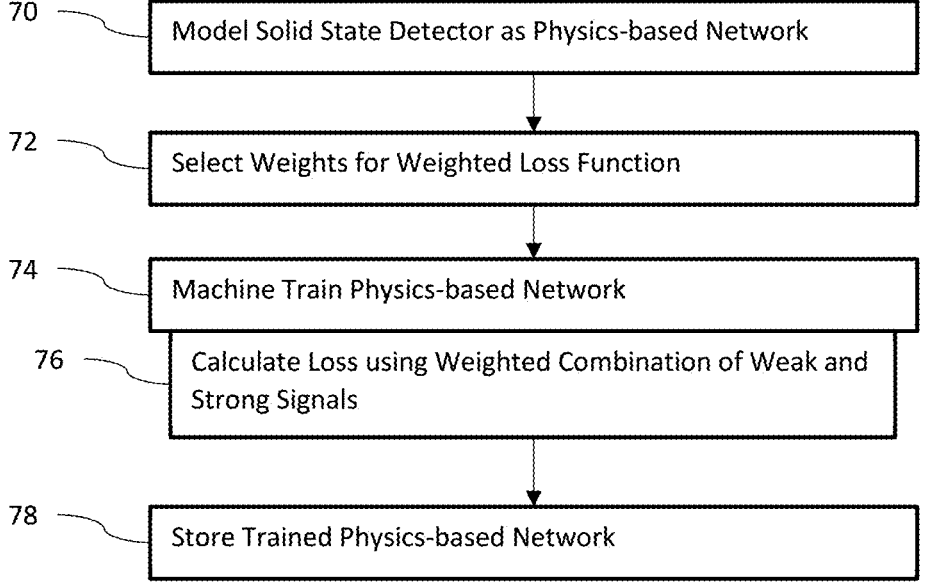
FIG. 7 is a flow chart diagram of one embodiment of a method for training a neural network modeling physical phenomena of semiconductor material.

FIG. 7 is a flow chart diagram of one embodiment of a method for training a neural network modeling physical phenomena of semiconductor material, such as RTSD. The training incorporates the weighted combination in the loss function in order to improve the accuracy with respect to relatively weak signals or physical phenomena. The method is for enhancement of the weak signals in machine training a charge transport network representing a solid-state detector.

Figure 6:
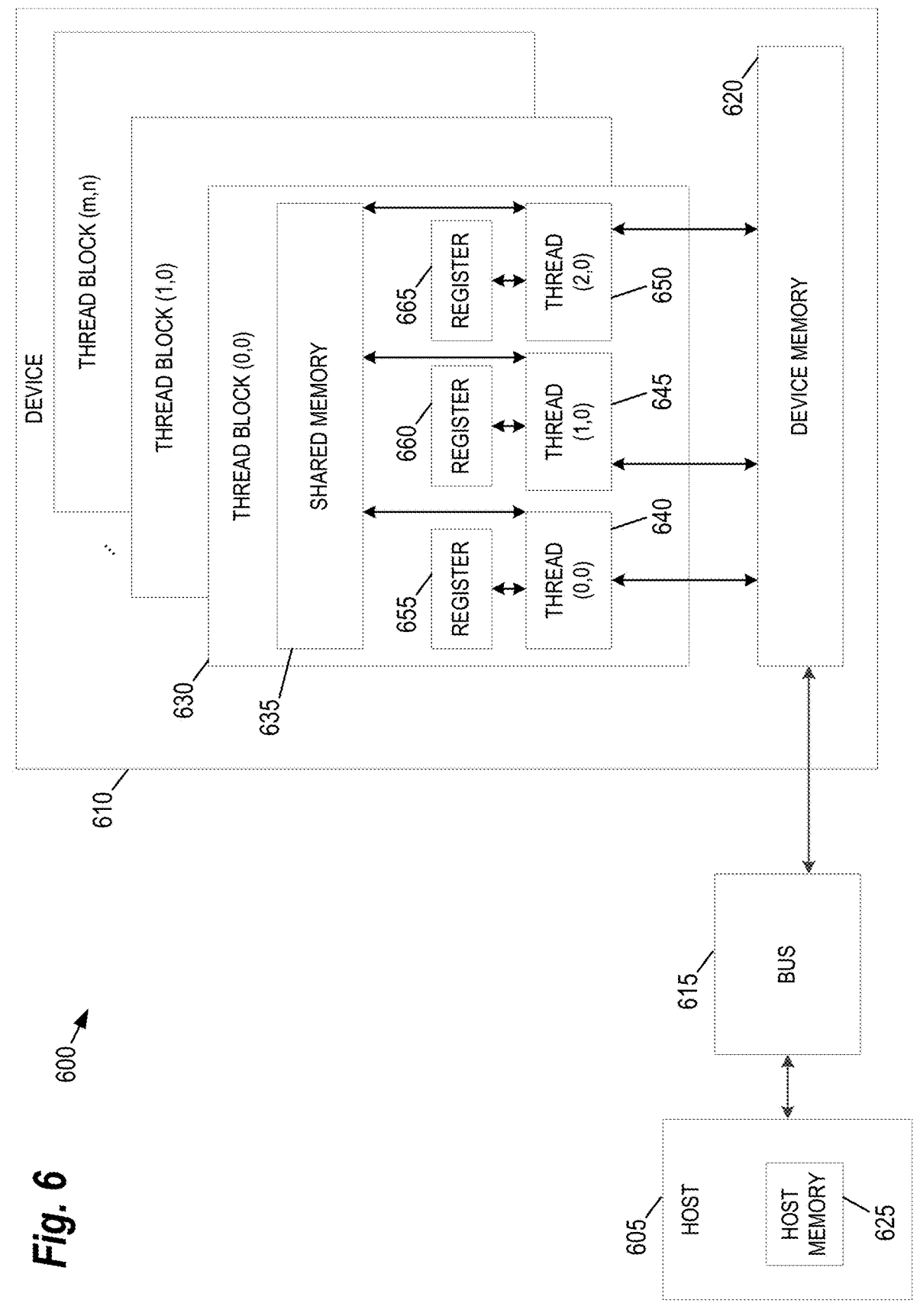
FIG. 6 provides an example of a parallel processing memory architecture that may be utilized to train or execute the network, according to some embodiments.

The method is implemented by the system of FIG. 6 or a different system, such as a computer, server, or workstation and memory. Additional, different, or fewer acts may be provided. For example, act 72 is not performed. Pre-determined weights are used. As another example, the trained physics-based neural network is applied instead or in addition to be stored in act 78.

In act 70, a solid-state detector, such as a RTSD or a non-room temperature semiconductor-based detector, is modeled as a physics-based network. The model is voxelized. For example, any of the models described in PART 1 may be used. The model may be based on a convolutional neural network, fully connected neural network, long-short term memory-based neural network, recurrent neural network, or another neural network but includes physics-based phenomena. The neural network is modeled to include one or more physical phenomena on a per voxel basis so that the training of the model learns to represent material properties of the detector.

Each voxel is represented in the neural network by a tensor field defined by (i) a location of the voxel within the semiconductor material and (ii) one or more physics-based phenomena including transport of holes or electrons within the voxel at the location. The physics-based phenomena include transport of electrons, trapping of the electrons, detrapping of the electrons, transport of holes, trapping of the holes, detrapping of the holes, recombination, voltage, and/or other signals within the voxel at the location. The physics-based phenomena for the whole detector may also include the anode and/or cathode signals.

Signals and corresponding physical phenomena at each voxel include one or more relatively weak signals and one or more relatively strong signals. For example, the modeling includes signal for holes as the relatively weak signal, and the voltage as the relatively strong signal. As another example, the modeling includes a signal for electrons as the relatively weak signal, and the voltage as the relatively strong signal. In other examples, the transport, trapping, and/or detrapping of holes and/or electrons provide relatively weak signals in the modeling for each voxel, and the voltage or signals from the cathode and/or anode provide relatively strong signals in the modeling. The hole signals may be considered relatively weak in relation to the electron signals.

In act 72, the weights of the different physical phenomena or signals are selected. At least two weights are provided for two or more phenomena or signals, respectively. Different weights are used for strong verses weak signals. The same or different weights may be used for different weak and/or different strong signals. Multiple measurements used in the loss function are weighted differently.

The loss is a weighted combination of different signals and/or quantities modeled in the physics-based network. For example, anode and/or cathode signals, voxel voltages, the transport of the holes and/or the electrons, the trapping of holes and/or electrons, the detrapping of holes and/or electrons, recombination, and/or other signals have terms in the loss function. These terms are directly weighted or indirectly weighted in the weighted combination forming the loss function. For example, one weight in the weighted combination is for the transport of the holes, another weight in the weighted combination is for the transport of electrons, and a third weight in the weighted combination is for the voltage. Unity or no weighting may be provided for none, one, or more of the terms in the loss function. In one embodiment, the loss includes calculated losses for the anode or cathode signals and voxel voltage, trapping of the holes, the transport of the holes, trapping of the electrons, the transport of the electrons, and/or other signals in the weighted combination.

In general, a loss function is a combination of terms. The weighted loss function adds coefficients or regularization coefficients as weights for one or more of the terms. For example, the weighted loss function is a sum of terms with weights for each of the terms. The weights may be unity (1.0) or another value. Summation, multiplication, subtraction, division, and/or other relationships between terms may be used.

In one embodiment, the loss to be used in machine training of the physics-based model is given by:

$$Loss=k[(signals)^2+(voltages)^2]+l[(free\ electrons)^2+(trapped\ electrons)^2]+n[(free\ holes)^2+(trapped\ holes)^2]$$

where the signals are the signals at the anode and cathode, the voltages are the voltage per voxel, the weight of the signals and voltage terms is k, weight of electrons is l, and the weight for the holes is n. Other loss functions may be used. A mean squared error loss based on this loss function is used, but other losses (e.g., mean absolute error) may be used. In the loss function, errors due to the signals and voltage are grouped together with a weighting term k, while the free and trapped charge electron and hole charges are grouped together with weighting terms l and n, respectively. In one embodiment, a linear voltage distribution over all the voxels is used with the anode voltage as Vmax volts and cathode voltage as 0 volts. The error between this reference voltage distribution and voltage distribution computed from the model is included in the loss function. One weight is applied to a sum for the transport and the trapping of holes, another weight is applied to a sum for the anode or cathode signals and the voxel voltage, and yet another weight is applied to a sum for the transport and the trapping of the electrons.

Other weighted combinations may be used. For example, the weights are split (i.e., additional weights are used). Instead of each weight being for a sum, separate weights are provided for each term of each sum. An example weighted loss function is given by:

$$Loss=k1(signals)^2+k2(voltages)^2+l1[(free$$
$$electrons)^2]+l2[(trapped electrons)^2]+n1[(free$$
$$holes)^2]+n2[(trapped holes)^2].$$

By using weights k1, k2, l1, l2, n1, and n2, particular properties of interest are weighted separately rather than grouping electron properties in general and grouping hole properties in general for weighting. Other loss functions of a combination of weights may be used, including loss functions with additional, different, or fewer properties and/or weights. In a more general form, the loss function is a stochastic objective function with suitable Lp-norm:

$$Loss=k1*f1(signals)+k2*f2(voltages)+l1*f3[(free$$
$$electrons)]+l2*f4[(trapped electrons)]+n1*f5$$
$$[(free holes)]+n2*f6[(trapped holes)].$$

where f1, f2, f3, f4, f5, and f6 denote functions of their argument, such as, for example, the L2 and L1 norms, and the Lp norm (where p<1).

To machine train in act 74, the values for the weights are selected in act 72. The selection may be manual or automated. For example, a predetermined or stored weight is loaded and used in training. As another example, an iterative loop of selecting weights and training is performed, where each iteration uses different weights. The resulting performance of the machine-trained model (e.g., mean error) is measured. By testing different values for the weights, the resulting model with an optimized performance (e.g., minimum mean error) may be identified.

Any search pattern may be used in testing different weights. Local or overall minima may be located. The weights with a minimum loss or loss below a threshold level across the voxels are determined and selected. Different weak signals are weighted the same or differently. Different strong signals are weighted the same or differently. The weights for one or more weak signals may be the same as for a strong signal but at least one weak signal is weighted more greatly than at least one strong signal in order to select weights resulting in a minimum loss in performance of the physics-based network.

In act 74, a processor machine trains the physics-based network. Deep learning is performed using training data. The values of the learnable parameters (weights) of the network are optimized based on the loss function comparing output of the network to the ground truth in a number of iterations or epochs. The overall loss is to be minimized over the corpus of training data by finding the optimum values of the learnable parameters of the network.

Any optimization method for stochastic objective functions may be used. In one embodiment, ADAM is used. Other gradient descent methods may be used.

The training data is from simulation, actual measurements, and/or another source. The training data includes the input charge and location as well as the ground truth signals resulting from that input, such as the voltage distribution, anode signal, cathode signal, any number of electron properties, any number of hole properties, and/or other phenomena by voxel. The training data may be formed from either or both of actual measurements and simulated measurements (augmentation). For example, the voltage distribution over the voxels and anode and cathode signals may be measured from physical detectors given an input charge and location. The signals for the other properties are provided by simulation, augmenting the training data. As another example, all the signals may be measured for multiple samples of training data, and simulation used for all the signals for additional samples. The actual measurements and any augmentation, such as through simulation or synthesis, forms the training data for a physical RTSD.

The physics-based neural network is machine trained using a weighted combination of losses calculated in act 76. The loss function includes a loss with respect to a relatively weak signal and a loss with respect to a relative strong signal. For example, losses for weak signals may include transport, trapping, and/or detrapping of holes and/or electrons. A loss may be provided for recombination. The losses for strong signals may include the voxel voltage and/or the anode and/or cathode signals. The electron coefficients may be considered strong relative to the hole coefficients. The different losses are combined in the loss function for the machine training. The weighting for one or more weak signals or properties is greater than the weighting for one or more strong signals. Any difference in weighting may be used. For example, the value of the weight for the weak signal is at least double, at least one order of magnitude, at least two orders of magnitude, at least three orders of magnitude, any other multiple of the value of the weight(s) for a strong signal, all of the strong signals, or any of the strong signals. The loss for the weak property is weighted more greatly than the loss for one, more, or all of the strong properties. For example, increasing the value of the regularization coefficients for the "weak" and "faint" quantities by a factor of about 100 relative to "strong" and "larger" quantities results in accuracy improvement in the trained neural network. About is used in this context as +/−10. The weights for the transport, trapping, detrapping, and/or other characteristics of electrons and holes is greater (e.g., second order of magnitude greater) than the weight for the anode or cathode signals and/or voxel voltage.

The processor calculates the loss as part of machine training. The difference between the ground truth in the training data and the estimated output generated by the physics-based neural network using the tensor field during training is calculated. Any error function may be used, such as a mean squared error (L2) or mean absolute error (L1). The physics-based model is trained by the input electron and hole injection pair and the corresponding output signals at the electrodes, along with free and trapped charges in each voxel. The loss error is computed as the sum of the mean squared error (M.S.E.) between the output from the model and ground truth output data, such as shown in the loss functions described above. In one embodiment, one defect level is provided for trapping. Multiple defect levels may be used (e.g., more trapping and/or detrapping centers for electrons and/or holes). Electron and hole transport and trapping at the one defect level is provided with the corresponding loss being given by:

$$Loss=k[(sg_{gt}-sg_L)^2+loss_{voltage_{point}}]+l[(qe_{gt}-ge_L)^2+$$
$$(qet_{gt}-get_L)^2]+n[(qh_{gt}-gh_L)^2+(qht_{gt}-qht_L)^2].$$

where q in this loss equation is a charge for trapped or free levels of holes and electrons in each voxel. Different values of the weights k, l, n may be used. Some representative weights that could be tested are: k=[0.1, 1, 10, 100], l=[0.1, 1, 10, 100], n=[0.1, 1, 10, 100]. The error of the trained RTSD weights (parameters) is calculated as a mean square error over the voxels N, represented by:

$$MSE_w = \frac{1}{N}\sum_{i=1}^{N}(q_{L,i}w_{L,i} - q_{gt}w_{gt,i})^2$$

where, $(q_{L,i}$ and $q_{gt}>1\times10^{-5})=1$, $(q_{L,i}$ and $q_{gt}<=1\times10^{-5})=0$, and w represents the properties or quantities being learned. Another calculation uses the mean square error represented as:

$$MSE_w = \frac{1}{N}\sum_{i=1}^{N}(w_{L,i} - w_{gt,i})^2$$

where the product with the charge is not used. Other error metrics may be used as well.

For a given injected electron and hole pair or charge at a given voxel, the material properties are calculated over a range of voxels at each of a range of times. For example, the electron-hole pair is injected at voxel 70 along a line of voxels. The hole properties are computed for voxels number 50-70, and the electron properties are computed for voxels number 70-100. The range of trained weights in the voxels depend on the trapping, detrapping and transport properties of electrons and holes within the material. Other ranges may be used. The property distribution over two or three dimensions, such as along electric field lines, may be used as well.

Using the weights in the weighted combination in the loss function separates the weak and faint quantities from strong and larger quantities (e.g., (a) holes as compared to electrons or voltage or (b) electrons as compared to voltage). A parametric analysis of the coefficients [k, l, n] shows the cause-effect that these relative weights have with respect to another. In the loss function, increasing the value of the regularization coefficients for the "weak" and "faint" quantities by a factor of ~100 relative to "strong" and "larger" quantities shows improvement in the accuracy of the machine-learned network (i.e., shows a lesser minimum error). Increasing further may degrade the overall performance by degrading the inference of the "stronger" and "larger" quantities. For example, the weight (e.g., k) for the stronger signals is 0.05-0.15, the weight for the electrons (e.g., l) is 50-150, and the weight for the holes (e.g., n) is 50-150. For instance, if n is higher than l, minor variations in the charges due to holes and charges trapped in the hole centers are captured. This not only provides a detailed variation of the loss function with different parametric weights but also identifies the best combination of these weights to provide the minimum loss. This approach of finding the logic behind the best possible parameters aids in identifying the relative weights of one parameter in comparison to another, which in turn improves training the learnable parameters of one of the charges (e.g., holes) in more details in comparison to the other charge (e.g., electrons).

Figure 8A:
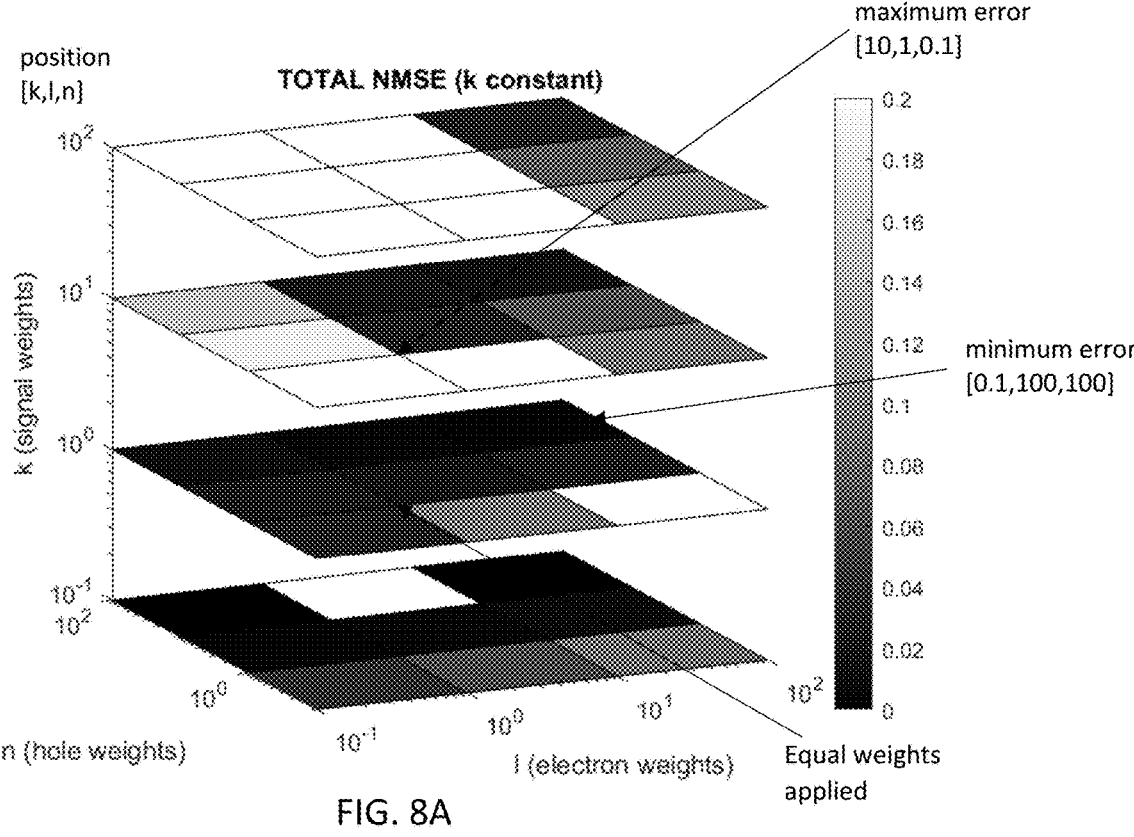
FIGS. 8A-C illustrate overall error minimization examples resulting from different combinations of weights in the loss calculation.
Figure 8B:
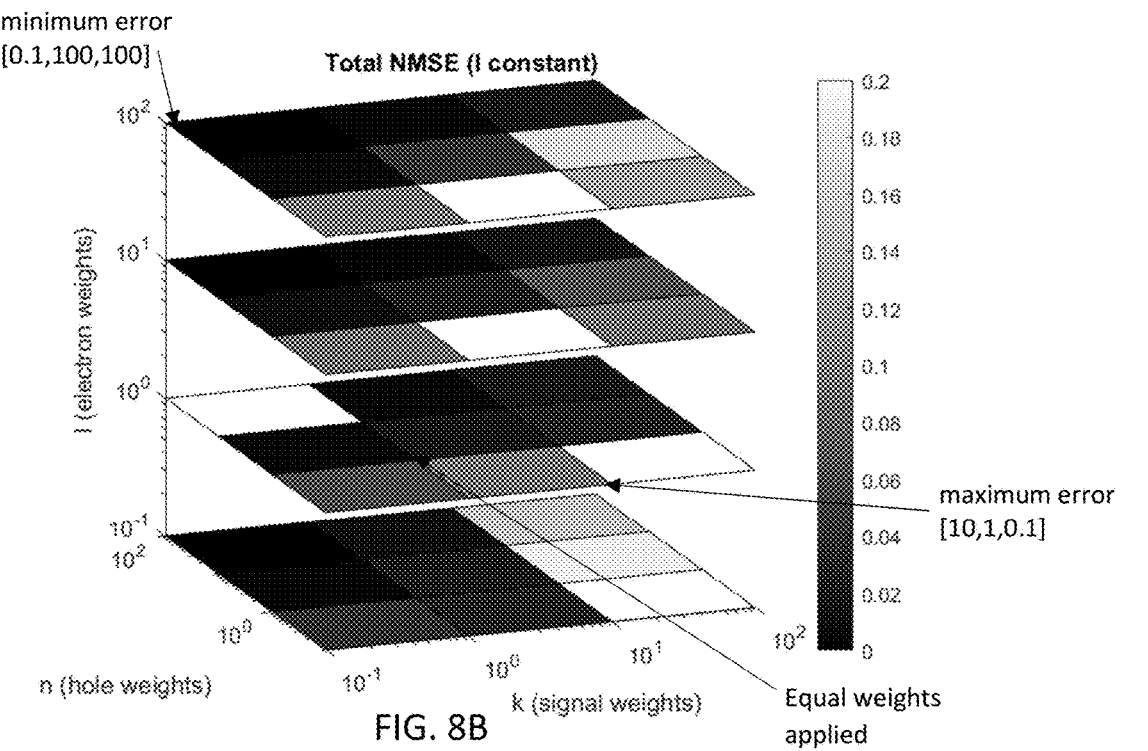
Figure 8C:
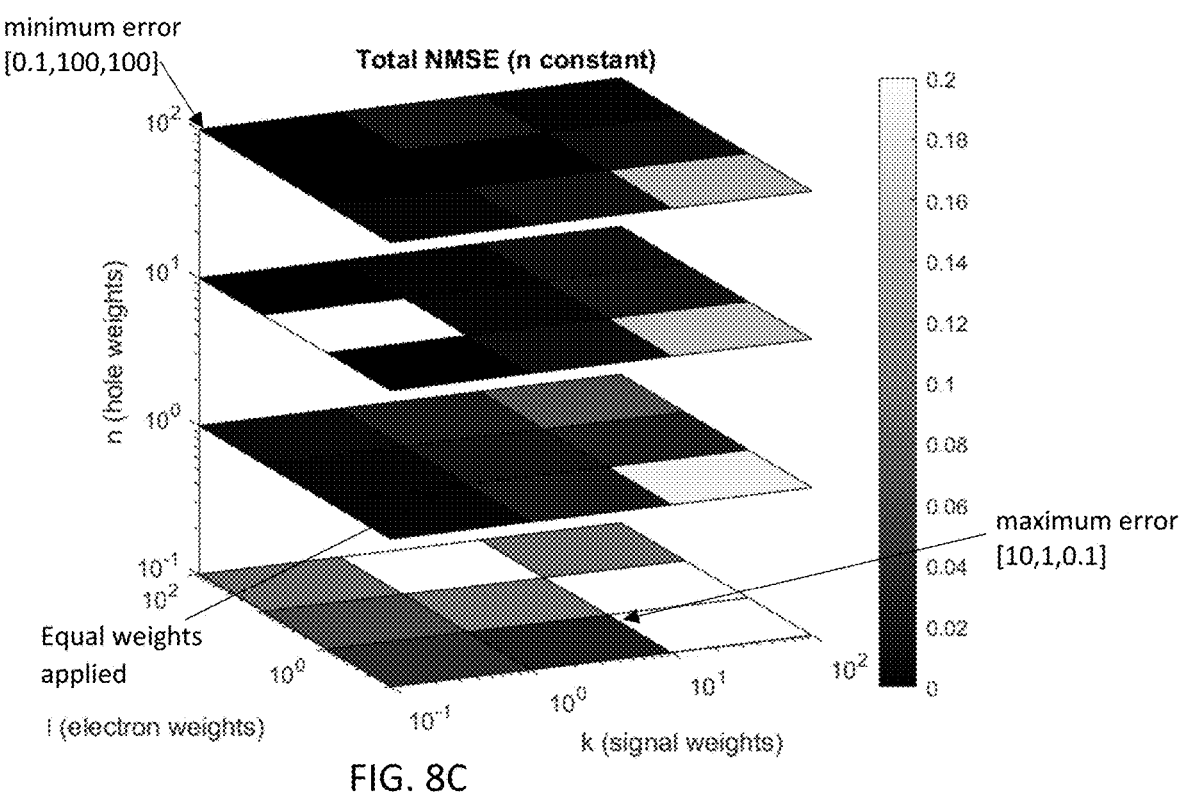

FIGS. 8A-C show examples of a 3D mapping of the normalized mean square error (NMSE) using different weight values for k, l, and n. FIGS. 8A, 8B and 8C show the total (sum over voxels and/or time) NMSE for varying k, l, and n values, respectively. The optimum values for each weight may be found sequentially or jointly. Based on the mappings, the minimum error is provided with the weights of k=0.1, l=100, and n=100. The maximum error is given with weights of k=10, l=1, and n=0.1, showing that the values of the weights affect performance of the machine trained physics-based network. The combination of weights providing a sufficient or threshold level of error are identified, such as the minimum error, an error a given % below the maximum, or an error below an absolute threshold (e.g., 0.1). By weighting the electron transport and trapping and hole transport and trapping about 100 to 1,000 times greater than the cathode and anode signals and the voxel voltage, a lesser error results from the trained network. Any performance measure for the error of the network may be used, such as L1 or L2 averaged or summed across the voxels and/or time. Other relative weights may be provided, depending on the model.

Figure 9A:
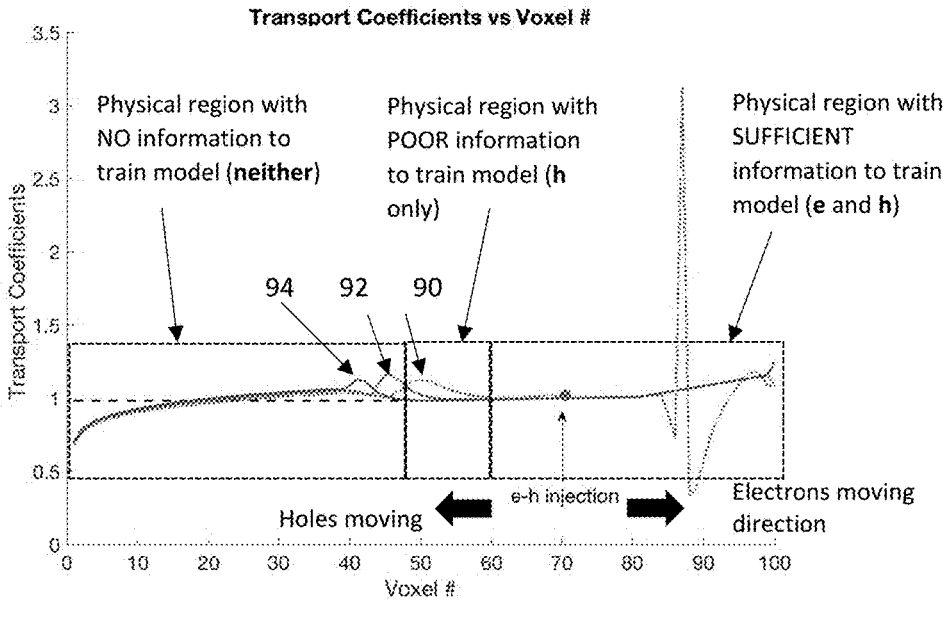
FIG. 9A is a graph showing an example extension or magnification of the range of holes provided by unequal weights in the loss calculation.
Figure 9B:
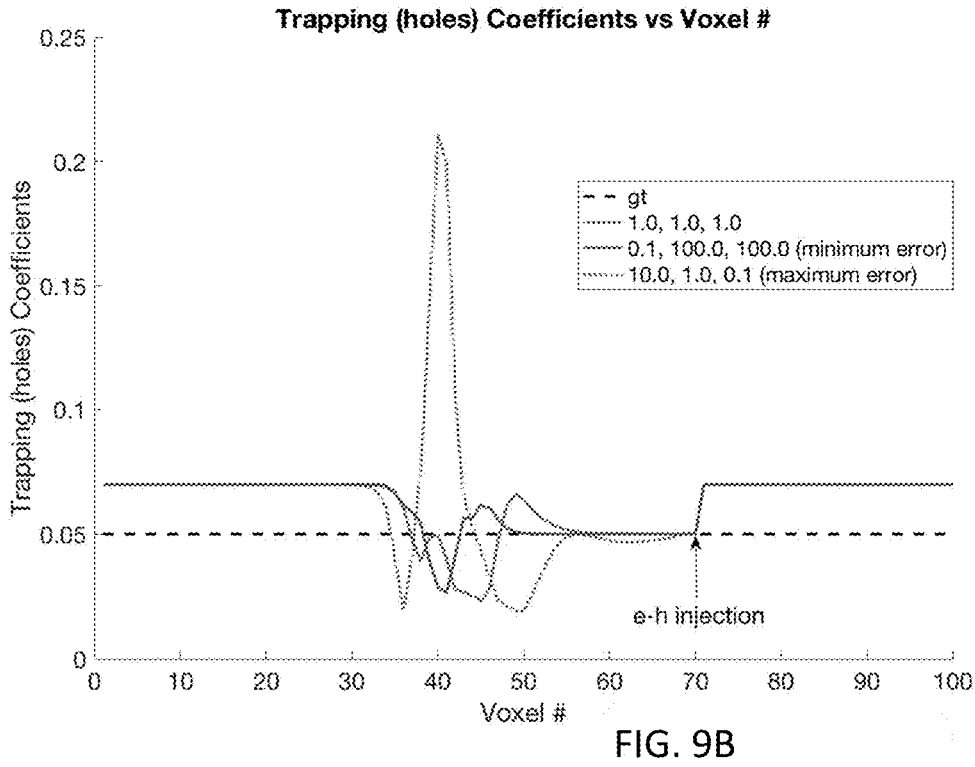
FIGS. 9B-9E are graphs showing examples of trapping and detrapping coefficients of holes and electrons.
Figure 9C:
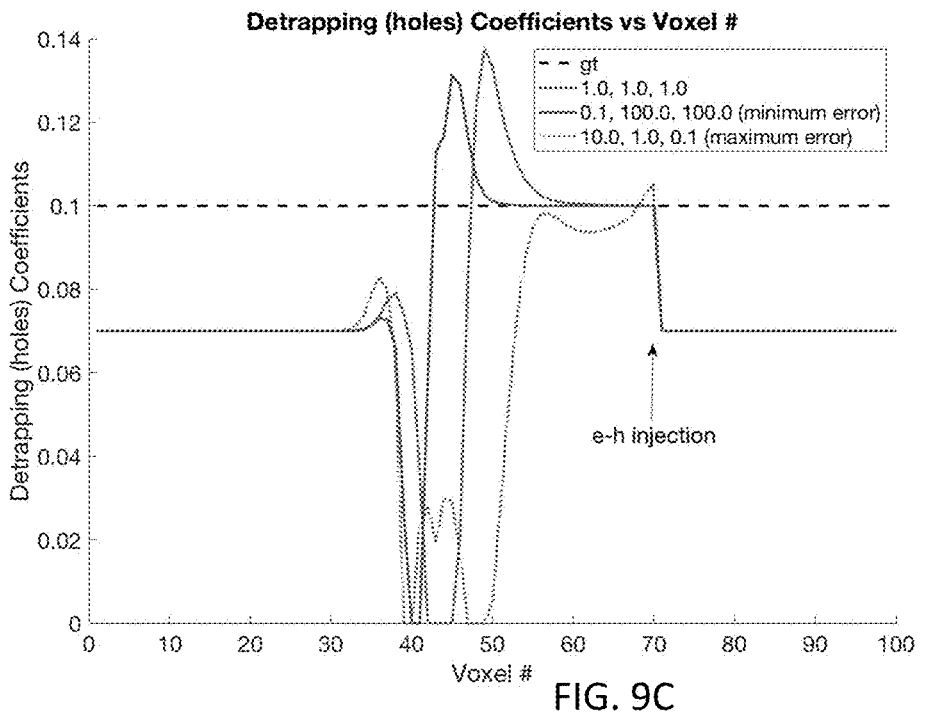
Figure 9D:
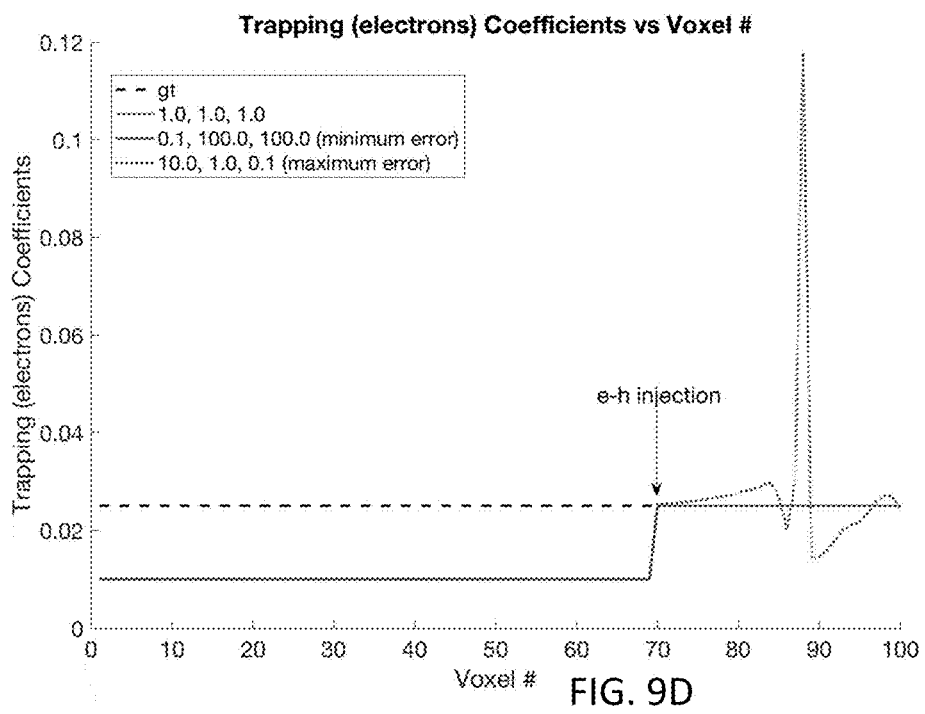
Figure 9E:
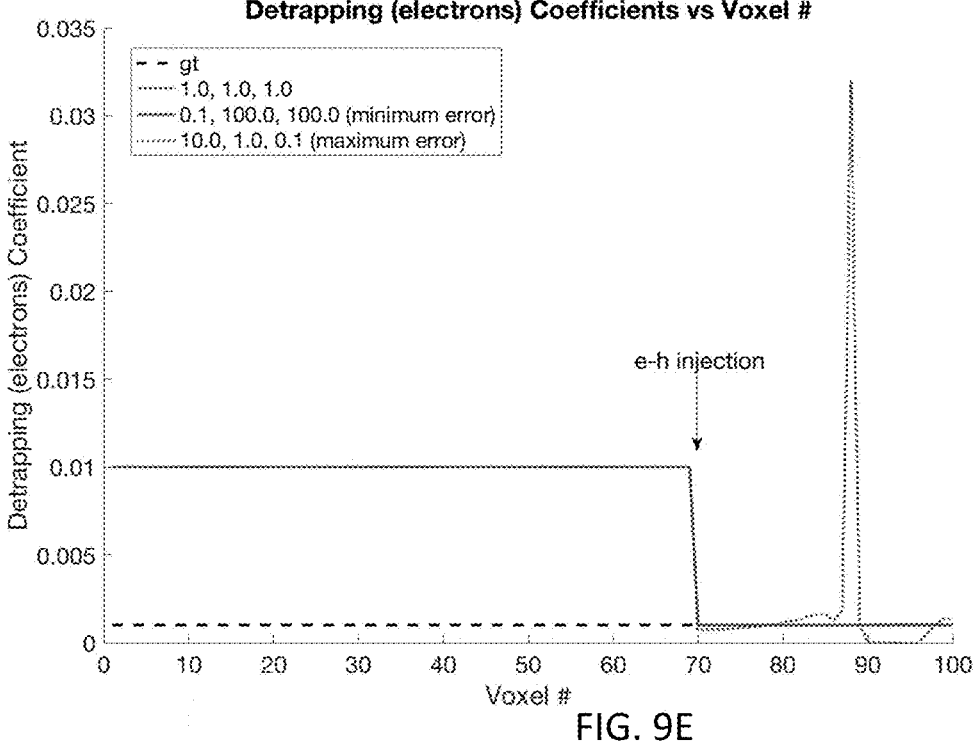

The relative weighting in the loss calculation for training provides for the model to have a greater spatial range for the weaker signals due to boosting by the increased weight. For example, the transport of holes extends over a greater range of voxels away from the injected locations. FIG. 9A shows an example of the enhanced inference improving and extending the range inside the material while providing acceptable accuracy of holes inferred quantities without degrading the accuracy of the electrons inferred quantities. The example of FIG. 9A is for transport weights along one dimension but may be extrapolated to two or three dimensions. The horizontal dashed line represents the ground truth. The curve 90 represents the predicted hole transport coefficients for the weights providing the maximum error [k=10.0, l=1.0, and n=0.1], the curve 92 represents the hole transport coefficients for unity or equal weights [k=1.0, l=1.0, and n=1.0], and the curve 94 represents the hole transport coefficients for the weights providing the minimum error. The curve 90 deviates from the ground truth closer to the injection than the other curves. The curve 94 deviates from the ground truth along the hole moving direction the furthest away from the injection location (voxel 70), indicating the increased range with accuracy provided by training with the enhancement of the weights for the weak signal relative to the strong signal. Without using the weighted loss function (i.e., curve 92), the deep learned physics-based model can only infer correctly the transport coefficient, which is the electric field E, from the movement of holes from voxel ~70 down to voxel ~55. When using the weights providing the minimum error (i.e., curve 94), the model correctly infers the transport properties using holes only signals from voxel ~70 down to voxel ~50, which corresponds to the theoretical value expected for the number of time steps calculated (no holes are expected to reach below voxel 50 due to the mobility of holes).

FIGS. 9B-E show the trapping coefficients for holes, the detrapping coefficients for holes, trapping coefficients for electrons, and detrapping coefficients for electrons, respectively. The ground truth and predicted coefficients for different weightings are represented, showing more optimum performance for the weightings provided by the minimum error.

The inference of trapping properties may be even more greatly influenced by the enhancement provided by the weighting for minimum error. The inference of detrapping properties may be even more greatly influenced by the enhancement provided by the weighting for minimum error. These improvements are provided without degrading electron and/or voltage related coefficients.

In act 78 of FIG. 7, the trained physics-based neural network is stored in a memory. The trained network has a network architecture representing the physics-based model and values for the learned parameters (weights) of the network. This information is stored so that the trained network may be used to predict or estimate the signals at the anode/cathode along with the free and trapped charges (electrons and holes) in the material, given an input location and charge. The trained network may be used for a specific detector, to predict signals and charges in a given detector.

In one simulation experiment, the detector material is considered to have uniform material properties. The model is trained by injecting unit electron-hole pairs at voxel positions 9; 19; 29; 39; 49; 59; 69; 79; 89 and 99 along 1D voxels from 0-100. The gradients for each electron-hole pair injection is computed and the overall gradient update is performed based on the sum of these individual gradients. In the trained model, weights of the voxelized model represent electron and hole coefficients in each voxel. The holes and electrons drift towards left and right ends of the detector, which are the cathode and anode, respectively. Since the holes have lower mobility than the electrons, the number of voxels trained (towards the cathode) by the holes injected at particular location is less than that trained (towards the anode) by the electrons. The trained model is tested with electron-hole pair injections at voxel positions 15; 25; 35; 45; 55; 65; 75; 85 and 95. The mean MSE between the output of trained model and the ground truth data (signals, charge and charge trapped) for this sample test case is 0.0093. This indicates the learned model achieves good accuracy when presented with unknown injection points. For an actual detector, the material properties assigned to the network for training may be set or limited based on known measures from the actual detector. Alternatively or additionally, measurements from the known detector are used in the training data so that the physics-based network is trained to generate material properties for that specific detector. This simulation and corresponding model use two-hole trapping centers and one electron trapping center in a 100 voxel 1D model. In other embodiments, a greater number of voxels, 2D distribution of voxels, 3D distribution of voxels, non-uniform material properties, different numbers of trapping centers, and/or nonuniform defects may be included.

Figure 10:
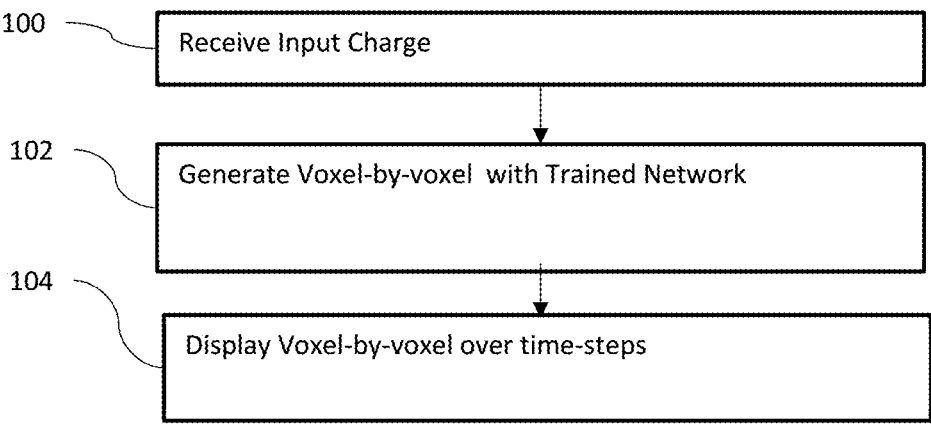
FIG. 10 is a flowchart diagram of one embodiment of a method for application of (inference by) a trained network modeling physical phenomena of a semiconductor material.

FIG. 10 is a flow chart diagram of one embodiment of a method for application of a trained network modeling physical phenomena of a semiconductor material. The physics-based model (e.g., machine trained neural network) trained as discussed for FIG. 7 is used to generate signals in the electrodes (anode and cathode) along with free and trapped charges in the material in each voxel, given an input charge and location.

The system of FIG. 6, a computer, server, or workstation performs the method of FIG. 10. Other systems may be used. Additional, different, or fewer acts may be provided. For example, the description is stored instead of being displayed. As another example, acts for using the description to simulate or model performance of a detector in detection or imaging for positron emission tomography, single photon emission tomography, Compton imaging, and/or x-ray imaging are provided.

In act 100, an input charge is received. The input represents interaction of an emission, such as a gamma ray emission from a radiopharmaceutical, with the detector. The energy and location of the input is designated.

Multiple input charge measurements may be received, such as representing a sequence of detected emissions. The voxel-by-voxel description of free and trapped charges (electrons and holes) along with signals generated in the anode and cathode is generated for each of the received input charge measurements in act 102.

In act 102, a processor generates a voxel-by-voxel description of free and trapped charges (electrons and holes) along with signals generated in the anode and cathode by applying the input charge measurement to the trained neural network. The trained neural network models holes, electrons and/or voltage voxel-by-voxel as the physical phenomena of the semiconductor material. The training used a weighted loss function using one or more weights for the holes, one or more weights for the electrons, and one or more weights for the voltage or signals. The weights for the holes were at least double the weights for the voltage or signals, such as being one, two, or three orders of magnitude larger. The weights for the electrons may be the same as or smaller than the weights for the holes. For example, the weights (e.g., k=0.1, l=100.0, and n=100.00) selected to minimize the error are used in the training. The weights for the holes and electrons are at least two orders of magnitude greater than the weight for the voltage.

In one embodiment, the trained physics-based network, in response to input of the charge and location, generates the voxel-by-voxel description of free and trapped charges (electrons and holes) along with signals generated in the anode and cathode. Additional (e.g., detrapping or recombination), fewer (e.g., no hole trapping), or different physical properties or signals may be modeled with this approach. The electron coefficients may have been weighted together or separately in the loss function. The hole coefficients may have been weighted together or separately in the loss function. By using the unequal weighting with greater weight values for weaker signals, the weights of the resulting machine-trained physics-based network is able to represent the voxel-by-voxel description for the holes and/or electrons over a greater range of voxels due to selected weights.

In act 104, a display screen displays at least a portion of the voxel-by-voxel description of free and trapped charges (electrons and holes) and/or signals generated in the anode and cathode in a graphical user interface. The processor extracts the properties of interest and displays them. Alternatively, the signals and charges can be stored or used for further imaging or simulation. The voxelized detector properties may be used to determine whether a given detector has sufficient quality for use in imaging.

FIG. 6 provides an example of a parallel processing memory architecture 600 that may be utilized to train or execute the physics-based network discussed above. This architecture 600 may use NVIDIA™ CUDA (or a similar parallel computing platform). The architecture includes a host computing unit ("host") 605 and a GPU device ("device") 610 connected via a bus 615 (e.g., a PCIe bus). The host 605 includes the central processing unit, or "CPU" (not shown in FIG. 6) and host memory 625 accessible to the CPU. The device 610 includes the graphics processing unit (GPU) and its associated memory 620, referred to herein as device memory. The device memory 620 may include various types of memory, each optimized for different memory usages. For example, in some embodiments, the device memory includes global memory, constant memory, and texture memory.

Parallel portions of the training algorithms may be executed on the architecture 600 as "device kernels" or simply "kernels." A kernel comprises parameterized code configured to perform a particular function. The parallel computing platform is configured to execute these kernels in an optimal manner across the architecture 600 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by a grid of thread blocks (described in greater detail below).

Using concurrent kernel execution, streams, and synchronization with lightweight events, the architecture 600 of FIG. 6 (or similar architectures) may be used to parallelize training tasks. For example, in some embodiments, processing of different nodes of the physics-based neural network.

The device 610 includes one or more thread blocks 630 which represent the computation unit of the device 610. The term thread block refers to a group of threads that can cooperate via shared memory and synchronize their execution to coordinate memory accesses. For example, in FIG. 6, threads 640, 645 and 650 operate in thread block 630 and access shared memory 635. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 6, the thread blocks 630 are organized in a two-dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints. In some embodiments, processing of subsets of the training data or operations performed by the algorithms discussed herein may be partitioned over thread blocks automatically by the parallel computing platform software. However, in other embodiments, the individual thread blocks can be selected and configured by the user to optimize training of the physics-based neural network.

Continuing with reference to FIG. 6, registers 655, 660, and 665 represent the fast memory available to thread block 630. Each register is only accessible by a single thread. Thus, for example, register 655 may only be accessed by thread 640. Conversely, shared memory is allocated per thread block, so all threads in the block have access to the same shared memory. Thus, shared memory 635 is designed to be accessed, in parallel, by each thread 640, 645 and 650 in thread block 630. Threads can access data in shared memory 635 loaded from device memory 620 by other threads within the same thread block (e.g., thread block 630). The device memory 620 is accessed by all blocks of the grid and may be implemented using, for example, Dynamic Random-Access Memory (DRAM).

Each thread can have one or more levels of memory access. For example, in the architecture 600 of FIG. 6, each thread may have three levels of memory access. First, each thread 640, 645, 650, can read and write to its corresponding registers 655, 660, and 665. Registers provide the fastest memory access to threads because there are no synchronization issues and the register is generally located close to a multiprocessor executing the thread. Second, each thread 640, 645, 650 in thread block 630, may read and write data to the shared memory 635 corresponding to that block 630. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 610 to read and/or write to the device memory 620. Device memory 620 requires the longest time to access because access must be synchronized across the thread blocks operating on the device. Thus, in some embodiments, the processing of each node of the physics-based neural network is coded such that it primarily utilizes registers and shared memory and only utilizes device memory as necessary to move data in and out of a thread block.

The embodiments of the present disclosure may be implemented with any combination of hardware and software. For example, aside from parallel processing architecture presented in FIG. 6, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions a computing system's processor to generate signals representing the GUI display images. The processor, under control of an executable procedure or executable application, manipulates the GUI display images in response to signals received from the input devices. In this way, the user may interact with display images using the input devices, enabling user interaction with the processor or other device.

As used herein, the term "module" can refer to either or both of: (i) a software component that causes an electronic device to accept various inputs and generate certain outputs; or (ii) an electronic input/output interface, such as a panel, frame, textbox, window or other portion of a GUI.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

We claim:

1. A method of training a network modeling physical phenomena of semiconductor material, the method comprising:

calculating a loss function for machine training of the network, wherein the loss function includes a weight combination of a first loss with respect to a weak signal and a second loss with respect to a strong signal, wherein the first loss for the weak signal includes at least a loss for a transport of holes or electrons, wherein the second loss for the strong signal includes at least a loss for a voxel voltage and/or an anode and/or cathode signals, wherein the first loss for the weak signal is weighted in the loss function at least an order of magnitude greater than that of the second loss for the strong signal; and machine training the network with the loss function, wherein the network models the semiconductor material in voxels, where each respective voxel is represented in the network by a tensor field defined by (i) a location of the respective voxel within the semiconductor material and (ii) one or more physics-based phenomena including transport of holes or electrons within the voxel at the location.

2. The method of claim 1 wherein the one or more physics-based phenomena includes transport of electrons and the transport of holes within the voxel at the location, and wherein calculating the loss includes the transport of the electrons and the holes in the weighted combination wherein a weight for the loss for the transport of electrons is at least an order of magnitude greater than the weight for the loss for the anode or the cathode signals or the voxel voltage.

3. The method of claim 2 wherein the one or more physics-based phenomena includes both the anode or cathode signals and the voxel voltage, trapping of the holes, the transport of the holes, trapping of the electrons, and the transport of the electrons, and wherein the loss function includes a loss for each of the anode or cathode signals and the voxel voltage, the trapping of the holes, the transport of the holes, the trapping of the electrons, and the transport of the electrons in the weighted combination, wherein the first loss for the weak signal comprises a first sum for the transport and the trapping of holes, wherein the second loss for the strong signal comprises a second sum for the anode or cathode signals and the voxel voltage, and wherein a loss of the transport of electrons comprises a third sum for the transport and the trapping of the electrons.

4. The method of claim 2 wherein a weight for the second loss for the strong signal is in the range of 0.05-0.15, wherein a weight for the first loss for the electrons is in the range of 50-150, and wherein a weight for the first loss for the holes is in the range of 50-150.

5. The method of claim 1 wherein the one or more physics-based phenomena includes trapping of holes or electrons within the voxel at the location, and wherein the loss function includes a loss the transport of the electrons or the holes and the trapping of the electrons or the holes, wherein the loss for the weak signal comprises a sum of the loss of the transport and trapping of the holes or electrons.

6. The method of claim 1 wherein the one or more physics-based phenomena includes trapping of holes or electrons within the voxel at the location, and wherein the loss function includes a loss for the transport of the electrons or the holes and a loss for the trapping of the electrons or the holes in the weighted combination wherein different weights are applied for the loss for trapping than for the loss for transport in the loss function.

7. The method of claim 1 further comprising selecting the weights for the weighted combination based on a minimum loss across the voxels.

8. The method of claim 1 wherein the physics-based phenomena include the transport of the holes, and wherein the calculating of the loss function with the weighted combination for a given instance of injected charge to the semiconductor material has a greater spatial range for the transport of the holes than wherein the first weight has a smaller value.

9. The method of claim 1 wherein machine training comprises training with training data, the training data from a combination of measurements for a physical room temperature semiconductor detector and augmentation.

10. The method of claim 1, wherein calculating the loss comprises calculating a difference between ground truth in training pairs and an estimated output.

* * * * *